(12) United States Patent
Theriault et al.

(10) Patent No.: US 7,016,974 B2
(45) Date of Patent: Mar. 21, 2006

(54) IMAGE PROCESSING

(75) Inventors: Eric Yves Theriault, Montreal (CA);
Gregor Dickie, Montreal (CA)

(73) Assignee: Autodesk Canada Co., Montreal (CA)

( * ) Notice: Subject to any disclaimer, the term of this patent is extended or adjusted under 35 U.S.C. 154(b) by 864 days.

(21) Appl. No.: 09/925,597

(22) Filed: Aug. 9, 2001

(65) Prior Publication Data
US 2002/0165927 A1 Nov. 7, 2002

(30) Foreign Application Priority Data
Apr. 20, 2001 (GB) .................................. 0109750

(51) Int. Cl.
G06F 15/173 (2006.01)
G06F 17/30 (2006.01)

(52) U.S. Cl. .................... 709/238; 709/242; 707/10
(58) Field of Classification Search ............... 709/224, 709/230; 345/440, 582; 707/205; 725/86; 711/170
See application file for complete search history.

(56) References Cited

U.S. PATENT DOCUMENTS

| 5,185,860 A | * | 2/1993 | Wu .............................. 709/224 |
| 5,371,896 A | * | 12/1994 | Gove et al. .................... 712/20 |
| 5,471,592 A | | 11/1995 | Gove et al. |
| 5,479,210 A | * | 12/1995 | Cawley et al. ........... 348/390.1 |
| 5,530,557 A | | 6/1996 | Asit et al. |
| 5,537,568 A | * | 7/1996 | Yanai et al. ................. 711/118 |
| 5,572,640 A | * | 11/1996 | Schettler ...................... 345/440 |
| 5,719,983 A | | 2/1998 | Henderson et al. |
| 5,845,148 A | * | 12/1998 | Ichikawa et al. .............. 710/8 |
| 6,148,383 A | * | 11/2000 | Micka et al. ................ 711/162 |
| 6,317,137 B1 | * | 11/2001 | Rosasco ...................... 345/582 |
| 6,389,432 B1 | * | 5/2002 | Pothapragada et al. ...... 707/205 |
| 6,553,423 B1 | * | 4/2003 | Chen ........................... 709/230 |
| 6,629,145 B1 | * | 9/2003 | Pham et al. ................. 709/230 |
| 6,680,942 B1 | * | 1/2004 | Mead et al. ................. 370/392 |
| 6,748,447 B1 | * | 6/2004 | Basani et al. ................ 709/244 |
| 2001/0029612 A1 | * | 10/2001 | Harnois ........................ 725/86 |
| 2002/0035595 A1 | * | 3/2002 | Yen et al. .................... 709/203 |

FOREIGN PATENT DOCUMENTS

| EP | 0 316 956 A2 | 5/1989 |
| EP | 0 535 807 A2 | 4/1993 |
| EP | 0 959 587 A2 | 11/1999 |

(Continued)

OTHER PUBLICATIONS

Abstract: JP 11331236 (NTT) May 19, 1998.

(Continued)

Primary Examiner—John Follansbee
Assistant Examiner—Kenny Lin
(74) Attorney, Agent, or Firm—Gates & Coooper LLP

(57) ABSTRACT

Network configuration data is automatically written to data structures in a networked image data processing environment. The environment includes several image processing systems (101–108) in which each image processing system has direct access to a respective frame storage device (111–118). Each image processing system includes a local configuration file specifying details of its locally connected storage device in combination with a network configuration data structure. A network (121) allows each image processing system to indirectly access the frame storage devices of other connected image processing systems. An image processing system transmits details of system configuration data to other networked processing systems. Furthermore, configuration data received from other networked image processing systems is added to local configuration data. Thus, when network configurations are changed, each system will identify its local condition, transmit this information to other systems and receive information from the other systems.

24 Claims, 25 Drawing Sheets

FOREIGN PATENT DOCUMENTS

| | | |
|---|---|---|
| GB | 2298335 A | 8/1996 |
| GB | 2337409 A | 11/1999 |
| GB | 2362771 A | 11/2001 |
| WO | WO 90/05422 | 5/1990 |
| WO | WO 00/58856 | 10/2000 |
| WO | WO 01/54350 A2 | 7/2001 |

OTHER PUBLICATIONS

Abstract: JP 11220475 (Hitachi) Feb. 3, 1998.

* cited by examiner

```
        [FRAMESTORES]
701──FRAMESTORE=BRAZIL        HADDR=192.167.25.56  ID=56
702──FRAMESTORE=SCOTLAND      HADDR=192.167.25.74  ID=74
703──FRAMESTORE=FINLAND       HADDR=192.167.25.72  ID=72
     FRAMESTORE=AUSTRIA       HADDR=192.167.25.54  ID=54
     FRAMESTORE=SYRIA         HADDR=192.167.25.64  ID=64
     FRAMESTORE=KUWAIT        HADDR=192.617.25.42  ID=42
     FRAMESTORE=BOLIVIA       HADDR=192.167.25.65  ID=65
     FRAMESTORE=ARGENTINA     HADDR=192.167.25.52  ID=52

[INTERFACES]
        FRAMESTORE=BRAZIL
711──PROT=HIPPI               IADDR=Ox03000003
712──PROT=TCP                 IADDR=192.167.25.56
        FRAMESTORE=SCOTLAND
713──PROT=HIPPI               IADDR=Ox03000001
        FRAMESTORE=FINLAND
714──PROT=TCP                 IADDR=192.167.25.72
        FRAMESTORE=AUSTRIA
        PROT=TCP              IADDR=192.167.25.54
        FRAMESTORE=SYRIA
        PROT=TCP              IADDR=192.167.25.64
        FRAMESTORE=KUWAIT
        PROT=HIPPI            IADDR=Ox03000002
        FRAMESTORE=BOLIVIA
        PROT=TCP              IADDR=192.167.25.65
        FRAMESTORE=ARGENTINA
        PROT=TCP              IADDR=192.167.25.52
```

*Figure 7*                                            343

IMAGE PROCESSING

FIELD OF THE INVENTION

The present invention relates to a network system for image data processing systems, in which a network configuration file on each computer is automatically updated whenever changes are made to the network.

BACKGROUND OF THE INVENTION

Networks for image data processing systems are known that use standard distribution protocols, such as Ethernet, TCP/IP and HiPPI. In video facilities houses, a recent trend has been towards having a plurality of different image processing stations therefore it has been appreciated that highly powered stations, having relatively high hourly charges, may be used for specific operations where a high degree of processing power is required. However, overall charges may be reduced by performing less demanding tasks at more modest stations. Matching the level of the task to the level of the station rather than to the location at which the image data needs to be stored requires methods for transferring that data as quickly as possible.

Co-pending British patent application 00 08 318.8, 2034-P565-GB and 2034-P564-GB describe methods of using a high bandwidth fibre channel switch, connected to a plurality of image processing stations and a plurality of redundant arrays of inexpensive disks (RAIDs), to convey image data over a high bandwidth channel without the cost of setting up a high bandwidth network. This is achieved either by requesting access to data stored in a RAID controlled by another station or by actually taking control of a RAID currently controlled by another station.

In this situation it is necessary that at all times every image processing station within the network is aware of exactly which stations are online and which RAIDs they are connected to, so that if a particular image processing station needs data from a particular RAID it has up-to-date information about which station presently controls that RAID and whether the data is currently available.

It is known to include within a processor a configuration file which contains information about the way in which the network is set up and which connections have been made, but at present these configuration files must be manually updated by a user when a change to the network takes place. It is also known for a computer coming online within a network to announce itself to all connected machines but still the configuration file must be updated manually.

This updating process often necessitates closing down all currently running applications, which is inconvenient and not always immediately possible, and so the configuration file on a particular processing system may remain incorrect for a period of time. Also, manual updating of a configuration file inevitably results in mistakes, especially when the user is unfamiliar or uncomfortable with the technology. Thus a system administrator must often be employed to be in charge of this updating. network configuration updated and send it to other machines on request. However, when machines are connected to various different networks, each using a different protocol, as is often the case, every machine within a network could require different information. In addition, a system administrator would again be necessary.

BRIEF SUMMARY OF THE INVENTION

Image data processing apparatus, comprising a plurality of image processing systems in which each of said image processing systems has direct access to a respective frame storage means; and a network connecting said image processing systems together so as to allow each connected image processing system to indirectly access the frame storage means of the other connected image processing systems; wherein each image processing system includes a local configuration file specifying details of its respective locally connected storage means, a network configuration data structure, and network communication means; wherein said network communication means is arranged to transmit details of its associated configuration file to other networked image systems, and to add configuration data to its associated network configuration data structure in response to configuration details received from other networked image processing systems.

BRIEF DESCRIPTION OF THE SEVERAL VIEWS OF THE DRAWINGS

FIG. 7 shows an example of a network configuration file in the memory of a processing systems;

BEST MODE FOR CARRYING OUT THE INVENTION

FIG. 1

Figure 1:
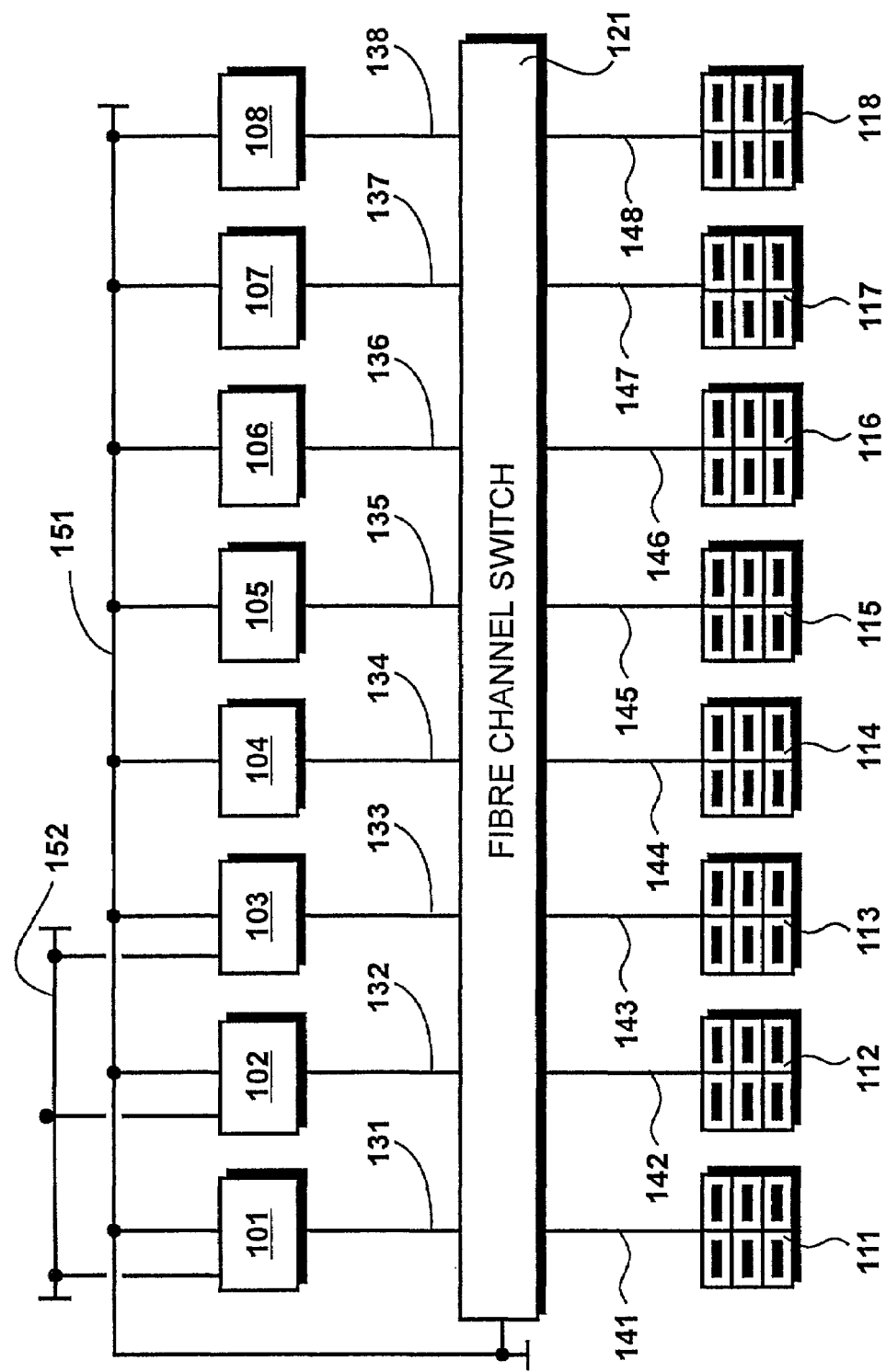
FIG. 1 shows an networked image data processing environment.

An example of a networked image data processing environment is illustrated in FIG. 1. The network includes eight image data processing systems 101, 102, 103, 104, 105, 106, 107 and 108. Each processing system 101 to 108 has a respective frame storage disk array (hereafter referred to as a framestore) 111, 112, 113, 114, 115, 116, 117 and 118. For example, each framestore 111 to 118 may be of the type obtainable from the present Assignee under the trademark "STONE" providing sixteen disks each having nine G-bytes of storage. Initially, each of the framestores is operated under the direct control of its respective processing system. Thus, framestore 111 is operated under the direct control of image data processing system 101 and framestore 113 is operated under the direct control of off-line processing system 103, but processing systems may swap control of their respective framestores for an unlimited period of time.

The environment includes a sixteen port non-blocking fibre channel switch type 121, such as the type made available under the trademark "GADZOOX". The switch is employed within the data processing environment to allow fast full bandwidth accessibility between each host processor 101 to 108 and each framestore 111 to 118. Each data processing system 101 to 108 is connected to the fibre channel switch by a respective fibre cable 131 to 138. Similarly, each framestore is connected to the fibre channel switch via a respective fibre cable 141 to 148.

An Ethernet network 151 allows communication between the data processing systems 101 to 108 and the fibre channel switch 121. In addition a high-bandwidth HiPPI network 152 connects processing systems 101, 102 and 103, but not processing systems 104 to 108. This mirrors existing operational environments, in which a processing system would be connected to a number of different networks, but not all systems would be connected to all networks. Hence, in this embodiment, processing systems 101 to 103 can communicate via a high-bandwidth network and the Ethernet, but processing systems 104 to 108 can only communicate via the Ethernet.

Within the environment, a single processing system, such as system 101, is selected as fibre channel switch master. Under these conditions, it is not necessary for all of the processing systems to be operational but the master system 101 must be online before communication can take place through the switch. However, in most operational environments, all of the processing systems would remain operational unless taken off-line for maintenance or upgrade etc. Processing system 101 communicates with the fibre channel switch 121 over the Ethernet network 151. Commands issued by processing system 101 to the fibre channel switch define physical switch connections between processing systems 101 to 108 and framestores 111 to 118.

On start-up, the fibre channel interface 121 is placed in the same condition that it was in when it was switched off. On the first start-up the switch would be placed in the default condition to the effect that each processor is connected through the switch 121 to its respective framestore. Thus, on first booting up processing system 101, for example, it mounts framestore 111, but if when processing system 101 was shut down it controlled framestore 117 it would mount framestore 117 again on booting up.

Thus each processing system is host to a particular framestore, which may or may not be the one which it originally controlled when the network was set up. Another processing system may only gain access to a framestore if it is allowed to do so by the processing system currently controlling that framestore. This access could be through fibre channel switch 121 or, in the case of processing systems 101 to 103, through the high-bandwidth HiPPI network 152.

For instance, if one of processing systems 104 to 108 requires fast access to any framestore, this must be achieved via fibre channel switch 121. If one of processing systems 101 to 103 requires access to a framestore controlled by one of processing systems 104 to 108, then again fast access can only be obtained via the fibre channel switch. However, if one of processing systems 101 to 103 requires access to a framestore controlled by another of 101 to 103, then the HiPPI network is as fast as the fibre channel switch and so either could be used.

In all cases the Ethernet could theoretically be used, but it is very slow and there are no compensating advantages, so in practice data is transferred either through the fibre channel switch or through the fastest network supported by both processing systems.

Hence when a network other than the Ethernet is available to a processing system, it is necessary that the processing system is aware of which other processing systems are connected to it and which are not. The invention ensures that this happens.

FIG. 2

Figure 2:
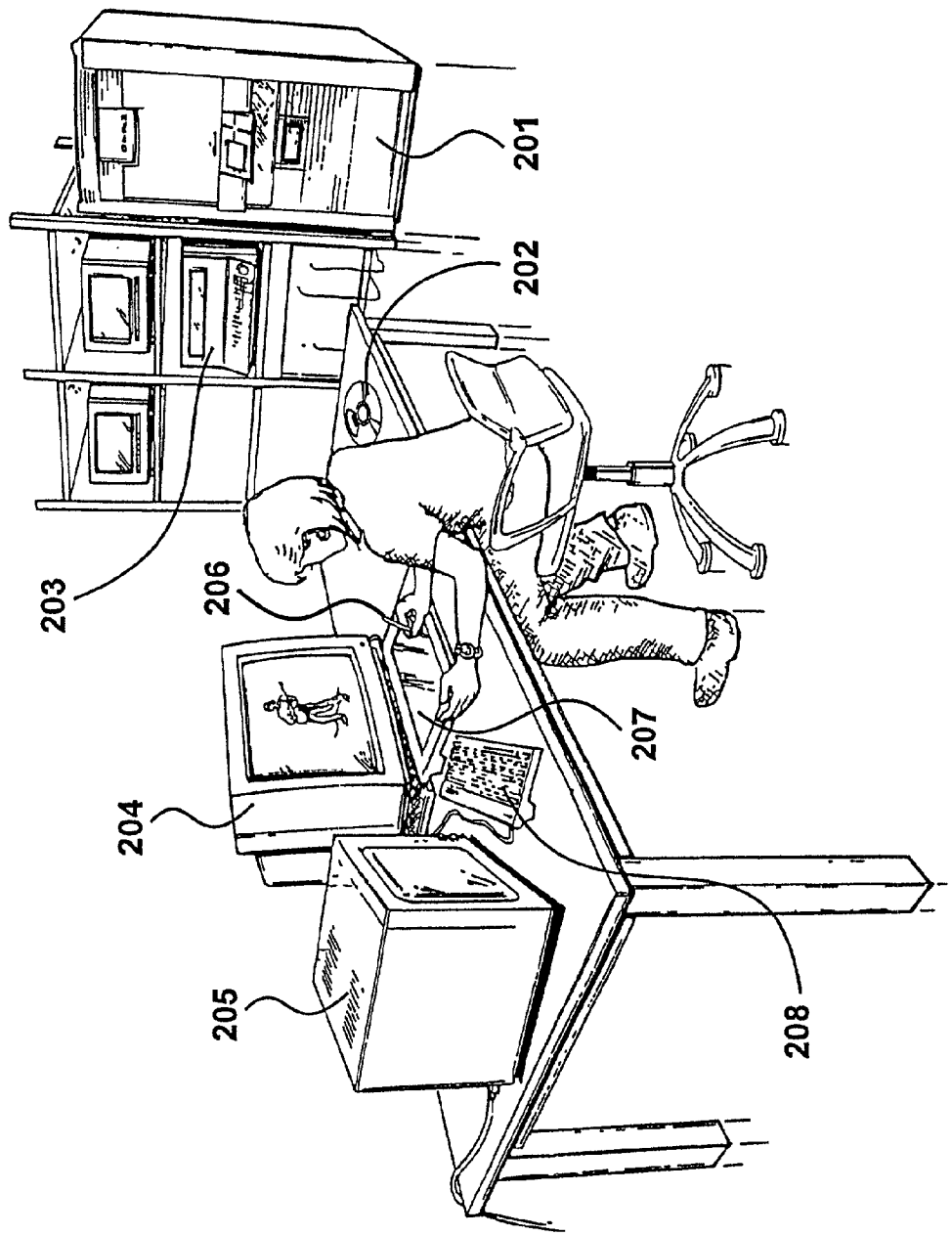
FIG. 2 illustrates an image processing system of the type shown in FIG. 1.

An image data processing system, such as processing system 101, is illustrated in FIG. 2, based around an octane processor 201. Program instructions executable within the octane processor 201 may be supplied to said processor via a data carrying medium, such as a CD ROM 202.

Image data may be loaded locally and recorded locally via a local digital video tape recorder 203 but preferably the transferring of data of this type is performed off-line, using stations 103 to 108.

An on-line editor is provided with a visual display unit 204 and a high quality broadcast quality monitor 205. Input commands are generated via a stylus 206 applied to a touch table 207 and may also be generated via a keyboard 208.

FIG. 3

Figure 3:
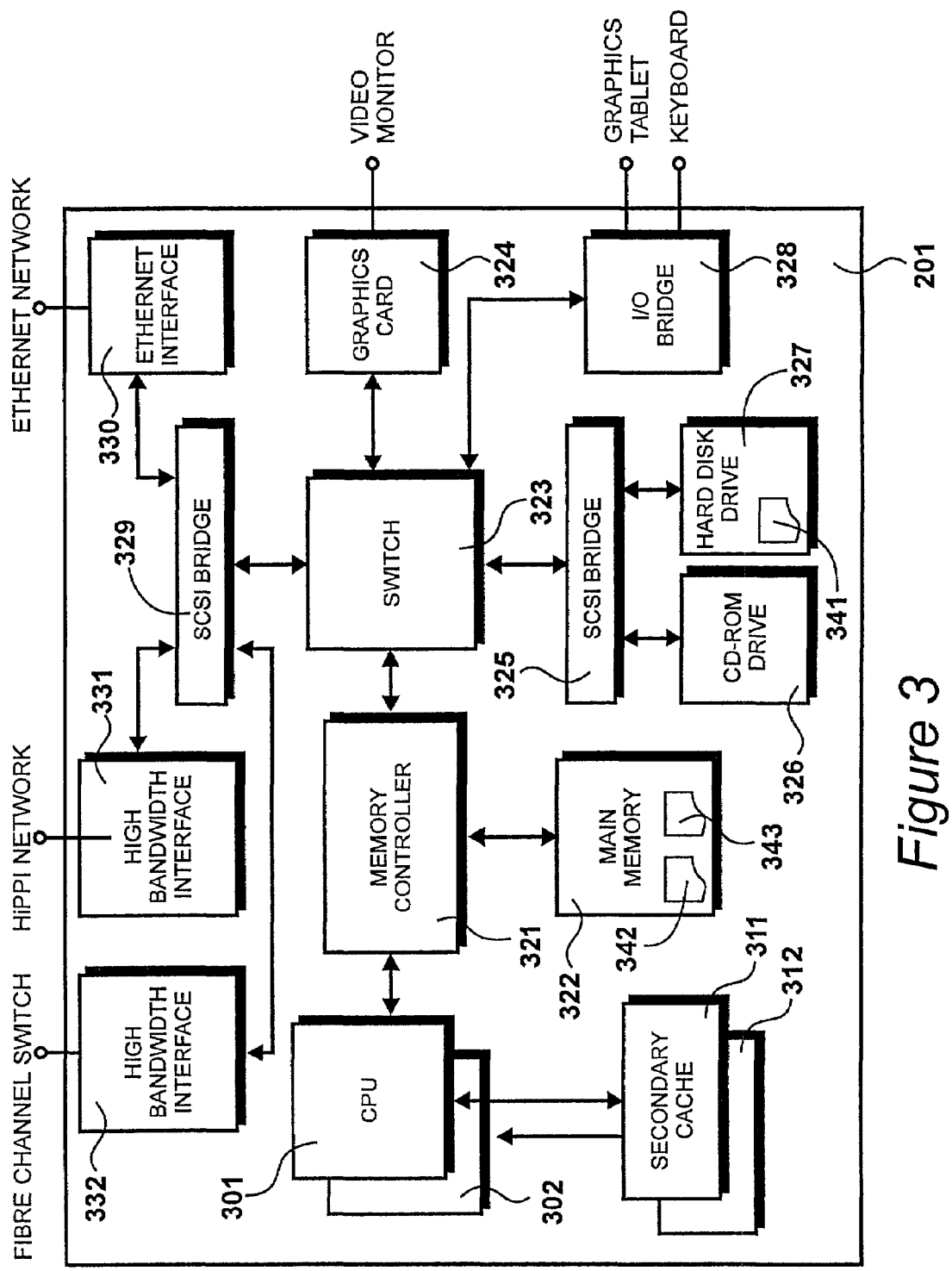
FIG. 3 illustrates a processor of the type shown in FIG. 2.

Processor 201 as shown in FIG. 2 is detailed in FIG. 3. The processing system 201 comprises two central processing units 301 and 302, operating in parallel. Each of these CPUs 301 and 302 has a dedicated secondary cache memory 311 and 312 that facilitates per-CPU storage of frequently used instructions and data. Each CPU 301 and 302 further includes separate primary instruction and data cache memory circuits on the same chip, thereby facilitating a further level of processing improvement. A memory controller 321 provides a common connection between the CPUs 301 and 302 and a main memory 322. The main memory 322 comprises two gigabytes of dynamic RAM.

The memory controller 321 further facilitates connectivity between the aforementioned components of the processor 201 and a high bandwidth non-blocking crossbar switch 323. The switch makes it possible to provide a direct high capacity connection between any of several attached circuits, including a graphics card 324. The graphics card 324 generally receives instructions from the CPUs 301 and 302 to perform various types of graphical image rendering processes, resulting in images, clips and scenes being rendered in real time.

A SCSI bridge 325 facilitates connection between the crossbar switch 323 and a DVD/CDROM drive 326. The DVD drive provides a convenient way of receiving large quantities of instructions and data, and is typically used to install instructions for the processor 201 onto a hard disk drive 327. Once installed, instructions located on the hard disk drive 327 may be transferred into main memory 322 and then executed by the CPUs 301 and 302. An input output (I/O) bridge 328 provides an interface for the graphics tablet 207 and the keyboard 208, through which the user is able to provide instructions to the processor 201.

A second SCSI bridge 329 facilitates connection between the crossbar switch 323 and network communication interfaces. Ethernet Interface 330 is connected to the Ethernet network 151 and first high bandwidth interface 332 is connected to the fibre channel switch 121 by connection 132. Second high bandwidth interface 331 is connected to the HiPPI network 152, but only on processing systems 101 to 103. Hence the processors of processing systems 104 to 108 are identical to the processor shown in FIG. 3 except that they do not have the second high bandwidth interface 331 since they are not connected to the HiPPI network 152.

Stored on the hard drive 327 is local configuration data 341 which contains information about the local connections of system 102, including which framestore it currently controls and what network interfaces it supports. On starting the processor local configuration data 341 is loaded into main memory 322 as file 342. Communications with each of processing systems 101 and 103 to 108 that are connected to the Ethernet result in a network configuration file 343 being written in memory 322. This contains connection information about all on-line processing systems, including system 102, and gives, for each framestore, the Ethernet address of the system which controls it and the best interface for communication.

For instance, this figure shows the processor of processing system 101, which is connected to the HiPPI network. The best way for 101 to communicate with processing systems 102 or 103 is via the HiPPI network, but for communication with processing systems 104 to 108 it would be the Ethernet. Hence, in network configuration file 343, a HiPPI address would be given for processing systems 102 and 103, and an Ethernet address for each of processing systems 104 to 108.

Local configuration data 341 must be manually written when the processing system is first connected to the network, but is automatically updated by the invention if a framestore swap occurs. It must be manually updated if the interfaces of the processing system change, but this should only occur if a system is physically unplugged from its present connections. This is envisaged to happen very infrequently and such disconnection would only be performed by a person knowledgeable enough to update the interface information. In addition, the information would still only have to be changed in the local configuration data 341 of the affected system. The invention would ensure that all other processing systems on the network were aware of the interface change.

FIG. 4

Figure 4:
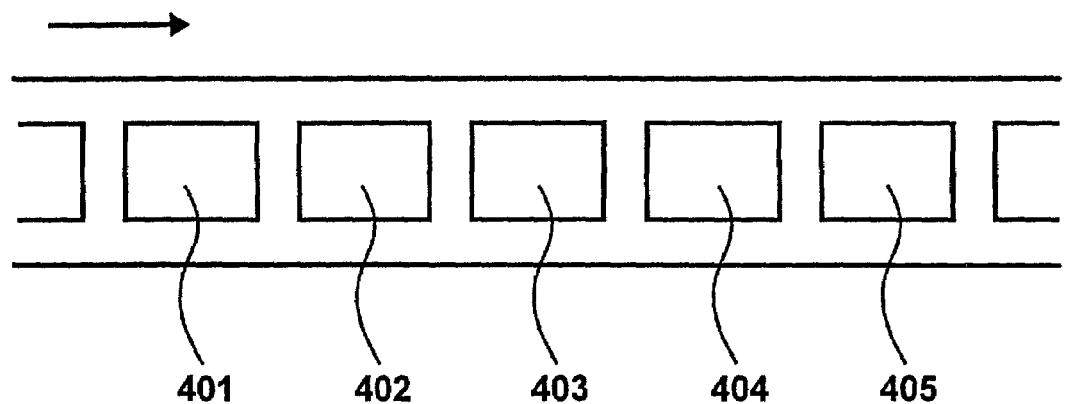
FIG. 4 illustrates image frames of the type processed by the system shown in FIG. 1.

A plurality of video image frames 401, 402, 403, 404 and 405 are illustrated in FIG. 4. Each frame in the clip has a unique frame identification (frame ID) such that, in a system containing many clips, each frame may be uniquely identified. In a system operating with standard broadcast quality images, each frame consumes approximately one megabyte of data. Thus, by conventional computing standards, frames are relatively large. Therefore even on a relatively large disk array the total number of frames that may be stored is ultimately limited. An advantage of this situation, however, is that it is not necessary to establish a sophisticated directory system thereby assisting in terms of frame identification and access.

As a processor, for example processor 101, boots up, it mounts its associated framestore. Stored on the hard drive of processor 101 is location data which describes the frames that are available within the framestore and in particular maps frame IDs to physical storage locations within the disk system. Thus, as illustrated in FIG. 4, the frame with ID 561000001 is stored at location 040000, the frame with ID 561000002 is at location 040001, and so on. Thus if an application identifies a particular frame it is possible for the system to convert this to a physical location within the framestore.

FIG. 5

Figure 5:
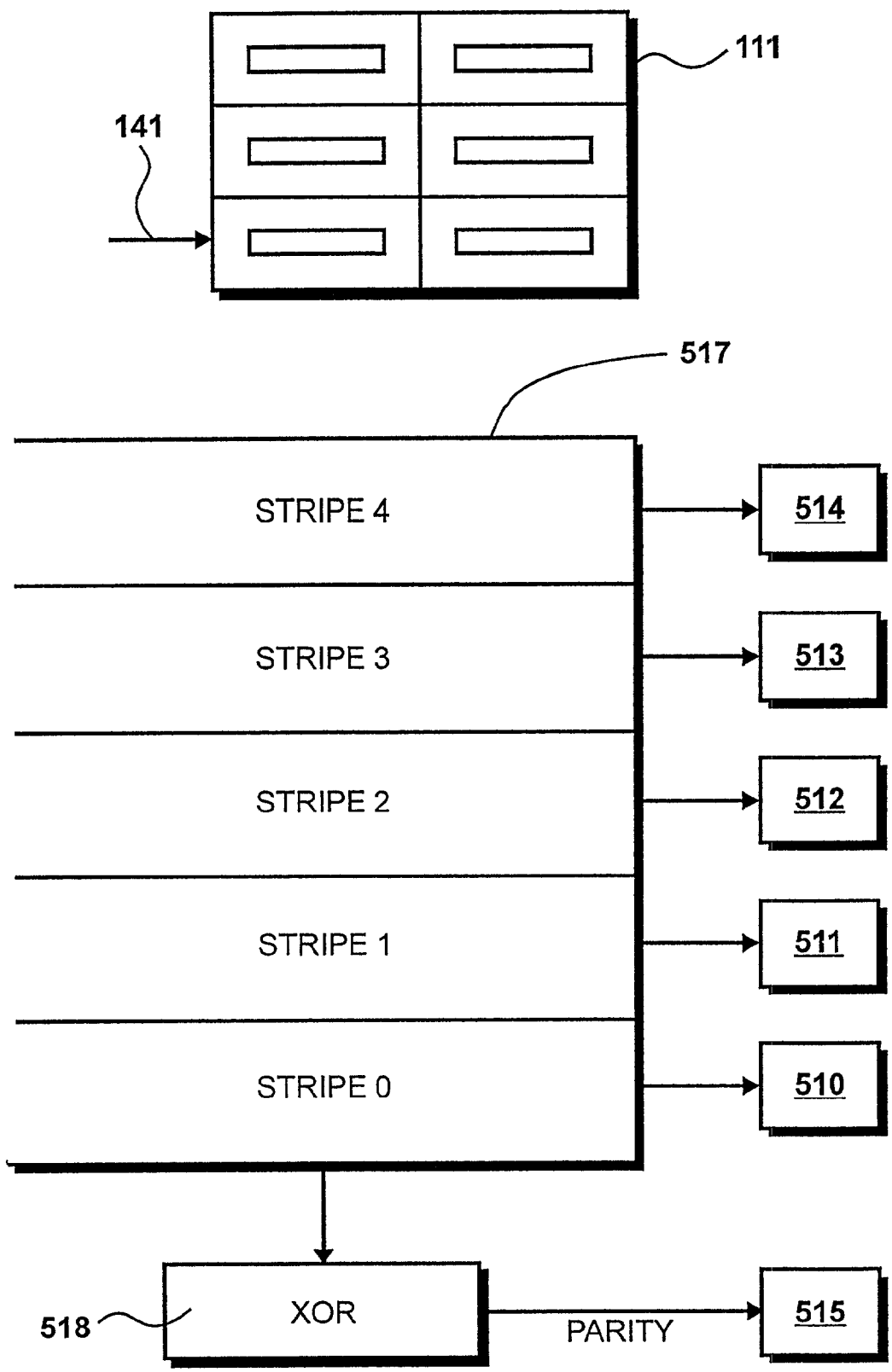
FIG. 5 illustrates a redundant array of inexpensive disks accessed by a fibre channel interface.

A framestore, such as framestore 111, is illustrated in FIG. 5. The framestore 111, connected to the fibre channel switch by fibre cable 141, includes six physical hard disk drives, illustrated diagrammatically as drives 510, 511, 512, 513 and 514. In addition to these five disks configured to receive image data, a sixth redundant disk 515 is provided.

An image field 517, stored in a buffer within memory, is divided into five stripes identified as stripe zero, stripe one, stripe two, stripe three and stripe four. The addressing of data from these stripes occurs using similar address values with multiples of an off-set value applied to each individual stripe. Thus, while data is being read from stripe zero, similar address values read data from stripe one but with a unity off-set. Similarly, the same address values are used to read data from stripe two with a two unit off-set, with stripe three having a three unit off-set and stripe four having a four unit off-set. In a system having many storage devices of this type and with data being transferred between storage devices, a similar striping off-set is used on each system.

As similar data locations are being addressed within each stripe, the resulting data read from the stripes is XORd together by process 518, resulting in redundant parity data being written to the sixth drive 515. Thus, as is well known in the art, if any of disk drives 510 to 514 should fail it is possible to reconstitute the missing data by performing a XOR operation upon the remaining data. Thus, in the configuration shown in FIG. 5, it is possible for a damaged disk to be removed, replaced by a new disk and the missing data to be re-established by the XORing process. Such a procedure for the reconstitution of data in this way is usually referred to as disk healing.

Each of these framestores shown in FIG. 5 is controlled by only one of processing systems 101 to 108. The system which controls a framestore may access it at will, but a processing system may need images stored on a framestore which it does not control. Hence in the network environment shown in FIG. 1 it is possible for a processing system, such as processing system 102, to gain either temporary or permanent access to a framestore connected to another processing system, such as framestore 113.

For example, if processing system 102 is performing a task which mainly uses images stored in its own framestore 112 but also requires some frames from framestore 113 then processing system 102 issues requests for these frames to processing system 103, which controls framestore 113.

If processing system 103 is able to allow access to framestore 113 then access can be achieved in one of two ways. Firstly, processing system 103 can return the locations of the requested frames to processing system 102 over Ethernet 151. It then requests a daemon running on processing system 101 to connect processing system 102 with framestore 113 via fibre channel interface 121 for a short period of time. The second method involves processing system 103 copying the required frames and sending them, via the fastest network supported by both processing systems, to processing system 102. In this case it would be the HiPPI network 152.

Alternatively, if a more permanent connection is required, processing systems may swap framestores. For example, while processing system 102 is performing a task processing system 103 may be loading data necessary for the next task for processing system 102. When processing system 102 completes the current task it swaps framestores with processing system 103 and has immediate access to the frames necessary for its next task. Processing system 103 may now archive the results of the task which processing system 102 has just completed.

Any of processing systems 101 to 108 may initiate this swap by requesting the switch-controlling daemon on processing system 101 to connect processing system 102 with framestore 113 and processing system 103 with framestore 112 via fibre channel interface 121. Each processing system mounts its new framestore and has complete control of it. For example, any processing system, including processing system 102, wishing to access framestore 112 must now request this access from processing system 103.

When this swap has occurred all other processing systems 101 and 104 to 108 must be informed, because if, for example, processing system 108 requires access to framestore 112, it now has to request it from processing system 103, where previously it had to contact processing system 102.

The present system involves manual updating of a configuration file stored on each of data processing systems 101 to 108, but the invention enables the updating to be performed by threads running on each of processing systems 101 to 108.

The local configuration of a processing system must be manually entered on its own hard drive when it is first connected to the network. As shown in FIG. 3, all processing systems contain local configuration data 341 on the hard drive 327, which only contains information about the local connections. This data is parsed and read into memory as file 342 when processing system 101 starts up.

FIG. 6

Figure 6:
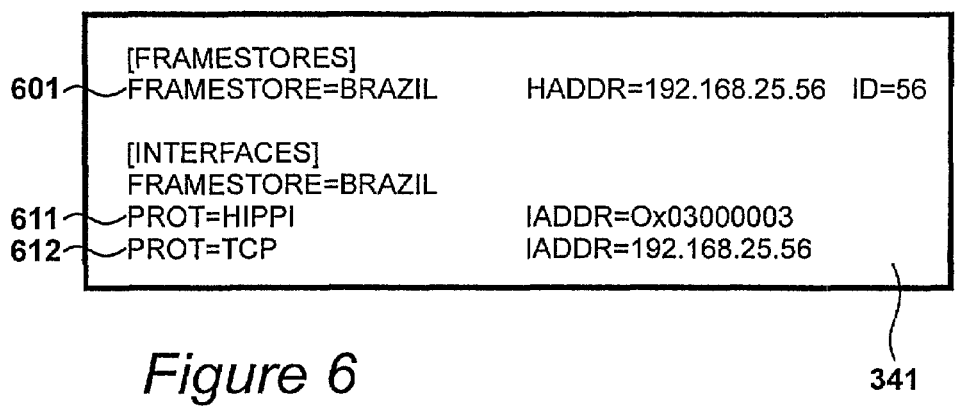
FIG. 6 shows an example of a local configuration file on the hard drive of a processing system.

FIG. 6 gives an example of such a file residing on processing system 101, although those on the hard drives of processing systems 102 to 108 are similar. Line 601 gives the information relating to framestore 111, the framestore which processing system 101 currently controls. (If, for example, processing system 101 had swapped with processing system 103 and now controlled framestore 113, then it would be framestore 113's details which would appear at line 601.) 'Brazil' is the name given to framestore 111 to make distinguishing between framestores easier for users, HADDR stands for Hardware Address, which is the Ethernet address of processing system 101 which controls the framestore, and the ID, fifty-six, is the framestore identification reference (framestore ID). As shown in FIG. 4, any frame stored within framestore 111 has a frame ID which contains the framestore ID, fifty-six. Thus when a user specifies a frame which he requires, the framestore on which it is stored is immediately known by identifying the framestore ID.

Lines 611 and 612 give information about the interfaces of processing system 101. As shown in FIG. 1, in this embodiment all the processing systems are connected to the Ethernet 151 and processing systems 101, 102 and 103 are also connected by a HiPPI network 152. In other embodiments (not shown) there may be various different networks using different protocols to which some processing systems are connected and others are not. Interfaces for every network to which a processing system is connected would be listed in that processing system's local configuration file. In FIG. 6, line 611 describes the HiPPI interface of processing system 101 and line 612 describes the Ethernet interface. The interfaces are always listed in a certain order, the interface to the fastest network first and that to the slowest network last, thus ensuring that the first interface listed communicates with a preferred network. Hence in this example HiPPI is listed first.

PROT stands for the protocol used to communicate through an interface, so in this example 'HiPPI' means that the HiPPI protocol is used for the HiPPI network and 'TCP' means that TCP/IP is used over the Ethernet. IADDR gives the address of the respective interfaces.

The Ethernet address hence occurs twice in the local configuration file, once as the hardware address on line 601 and once as an interface address on line 603. This is because the FRAMESTORES and INTERFACES parts of the network configuration file 343 are used for different procedures and the local configuration data 341 must use the same structure as file 343 for ease of collating information.

FIG. 7

When processing system 101 is switched on a thread reads local configuration data 341 into memory 322 as file 342 as shown in FIG. 6, and also creates network configuration file 343 containing information about all other online users within the network. FIG. 7 shows an example of a network configuration file stored in the memory of processing system 101, which contains information for the eight processing systems 101 to 108. The network configuration files in the memory of processing systems 102 to 108 are similar to this, but contain slightly different information.

The first framestore, at line 701, is Brazil, which FIG. 7 showed as framestore 111 connected to processing system 101. Line 702 gives information about framestore Scotland which has ID seventy-four. For example, this may be framestore 118. The network configuration file 343 cannot tell a user which processing system currently controls framestore 118, but an address of that processing system is given which is all that is necessary to contact it.

Line 703 gives information about framestore Finland, which has ID seventy-two, and its controlling processing system. For example, this may be framestore 113.

Lines 711 and 712 give the interface information for processing system 101, listed under 'Brazil' because that is the framestore which it currently controls, as in FIG. 6. Line 713 gives interface information for the processing system controlling 'Scotland' and line 714 gives interface information for the processing system controlling 'Finland'.

Only one interface is described for each online processing system (except the processing system on which the configuration file resides, in this case 101). The interface given is the one for the fastest system which both processing system 101 and the processing system controlling the respective framestore support. The interface given at line 714 is an Ethernet address, implying that the system controlling framestore 'Finland' is not connected to the HiPPI network. The interface given at line 713, however, is a HiPPI address, so the system controlling 'Scotland' is connected to the HiPPI network and hence communications between this processing system and system 101 can take place over this network rather than the slower Ethernet.

At present, a network configuration file such as 343 would have to be manually updated whenever a change occurs. The present invention ensures that file 343 is updated automatically whenever a processing system comes online, is switched off, crashes or exchanges framestores, thus guaranteeing that whenever access is needed to a framestore the correct processing system is asked for access.

Figure 8:
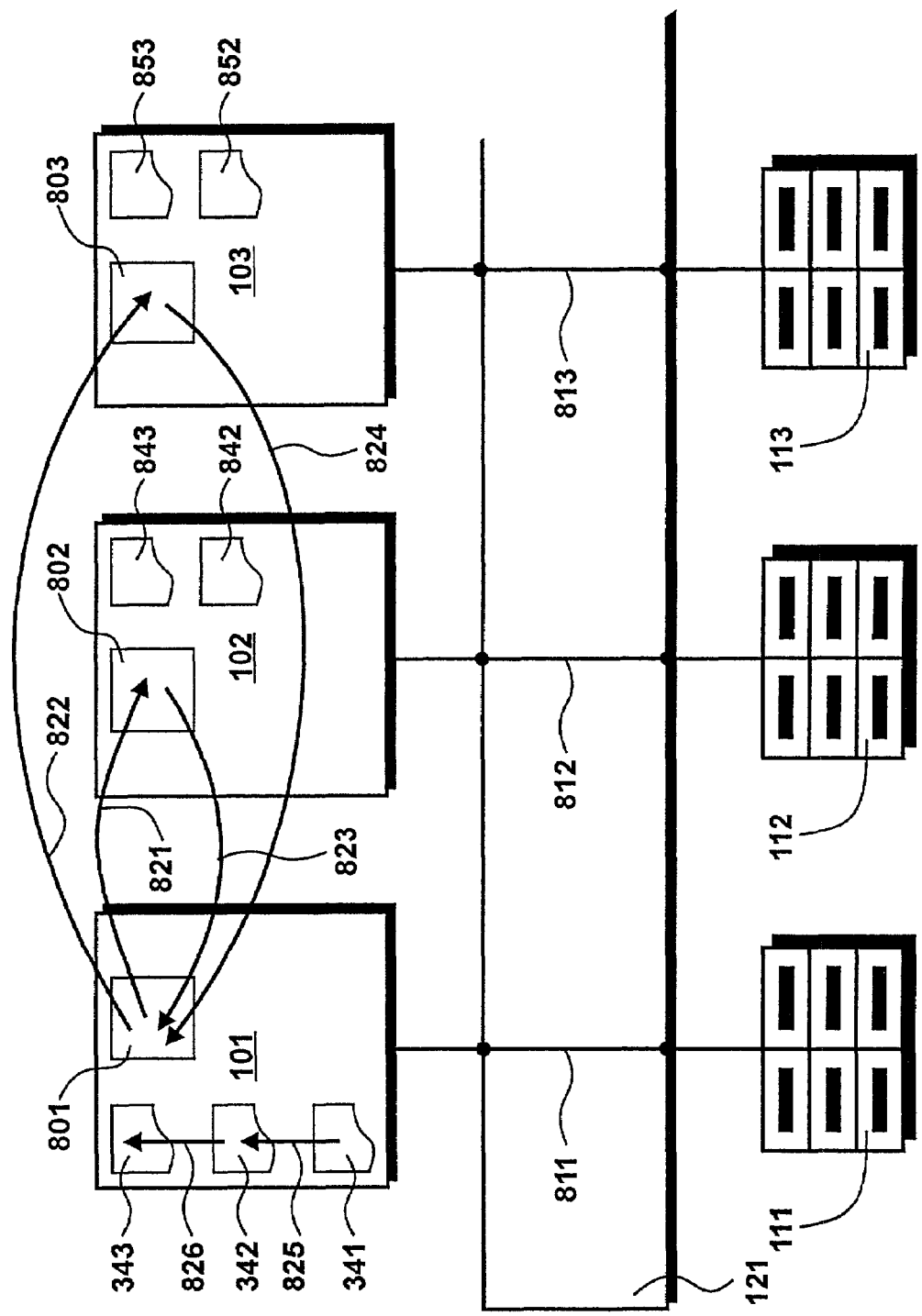
FIG. 8 shows the first set of communications embodying the invention.
Figure 9:
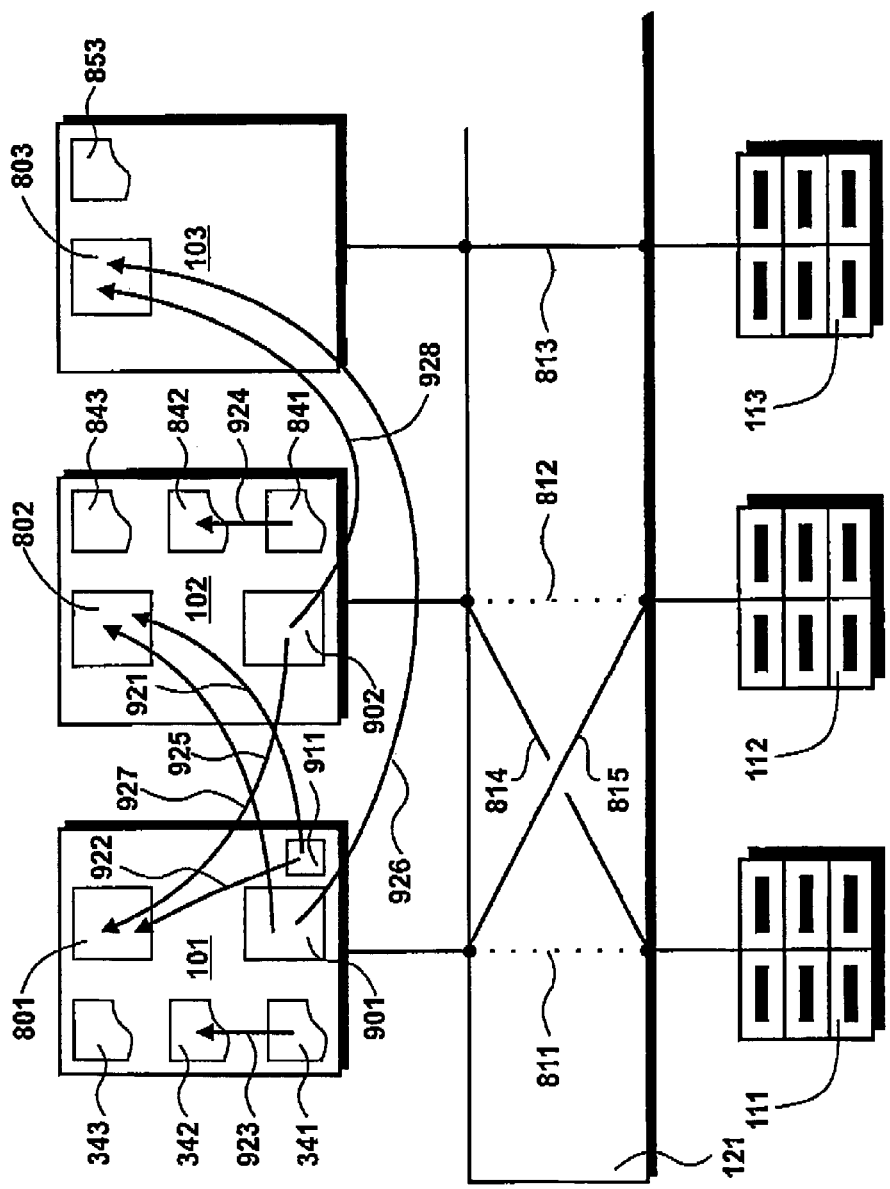
FIG. 9 shows the second set of communications embodying the invention.

In this embodiment, the invention is performed by two threads running on each of processing systems 101 to 108. FIGS. 8 and 9 illustrate the functions of these.

FIG. 8

FIG. 8 shows processing systems 101, 102 and 103. The two threads which embody the invention run on all processing systems but the example in this Figure shows only three processing systems. Primary threads 801, 802 and 803 on processing systems 101, 102 and 103 respectively are all identical.

Processing systems 102 and 103 are already online and respectively contain in their memory files 842 and 852, containing their local configurations, similar to file 342 shown in FIG. 6, and network configuration files 843 and 853, similar to network configuration file 343 shown in FIG. 7. Each also has local configuration data on their hard drive which is not shown. Processing system 102 is connected to framestore 112, as shown by connection 812, and processing system 103 is connected to framestore 113, as shown by connection 813. Processing system 101 is off-line and therefore framestore 111 is unavailable for access, but processing system 101 and framestore 111 are connected within fibre channel switch 121 as shown by connection 811.

When processing system 101 is switched on, local configuration data 341 stored on the hard drive is read into memory as file 342 as shown by path 825, and then copied to become the basis for network configuration file 343 as shown by path 826. Primary thread 801 on processing system 101 reads file 342 and announces it on the Ethernet network.

This announcement is caught by primary threads 802 and 803 on processing systems 102 and 103 respectively, as shown by paths 821 and 822. Primary thread 802 reads file 842 and sends it to processing system 101, as shown by path 823, and then adds the information contained in the announcement to its network configuration file 843. Similarly, primary thread 803 sends file 852 as shown by path 824, and adds the information contained in the announcement to its network configuration file 853.

Primary thread 801 on processing system 101 catches these messages and adds the information contained in them to its network configuration file 343.

Hence processing systems 102 and 103, which were already online, are aware of processing system 101 coming online, and are also aware of its network addresses and which framestore it controls. In addition, processing system 101 knows that systems 102 and 103 are online, knows their network addresses and which framestores they control.

FIG. 9

FIG. 9 illustrates the second thread which runs when a framestore swap occurs. As shown in FIG. 8, processing systems 101 to 103 are connected within the framestore switch to framestores 111 to 113 respectively as shown by connections 811 to 813 respectively. A framestore swap occurs such that processing system 101 now controls framestore 112, as shown by connection 814, and processing system 102 is now connected to framestore 111 as shown by connection 815.

A second thread, shown as maintenance thread 901 on processing system 101 and maintenance thread 902 on processing system 102, receives a message from the swap utility 911 which informs it of its new framesrore. In this example the swap utility 911 has been carried out on processing system 101, but it can run on any of processing systems 101 to 108, regardless of which systems are actually involved in the swap. In this case swap process 911 announces the swap to processing system 102, as shown by path 921, and effectively announces it to its own processing system 101 as shown by path 922. Maintenance threads 901 and 902 update their respective local configuration data 341 and 841, reread them into memory as files 342 and 842, as shown by paths 923 and 924, and change their respective network configuration files 343 and 843.

Maintenance threads 901 and 902 then announce their new configurations on the Ethernet. Primary threads 802 and 803 catch the announcement by thread 901, as shown by paths 925 and 926 respectively, and threads 801 and 803 catch the announcement by thread 902, as shown by paths 927 and 928 respectively. Primary threads 801, 802 and 803 then update their respective network configuration files 343, 843 and 853. Hence each processing system is now aware that the swap has taken place, and each local and network configuration file is correct.

Both the primary and maintenance threads have other duties which will be enlarged upon later.

FIG. 10

Figure 10:
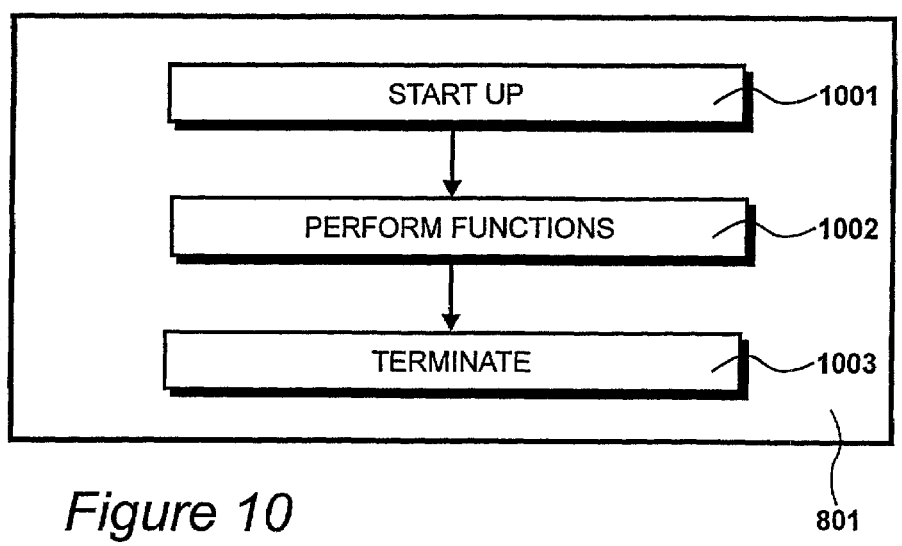
FIG. 10 illustrates the primary thread shown in FIG. 8.

FIG. 10 shows the basic process of primary thread 801 on processing system 101. Threads 802 and 803 on processing systems 102 and 103 are identical to 801, as are threads on each of processing systems 104 to 108. The thread starts when the processor is switched on and at step 1001 a start up process is performed which writes network configuration file 343.

At step 1002 various functions are performed which keep the network configuration file accurate if the network structure changes, and at step 1003 the thread terminates when the processor is switched off.

FIG. 11

Figure 11:
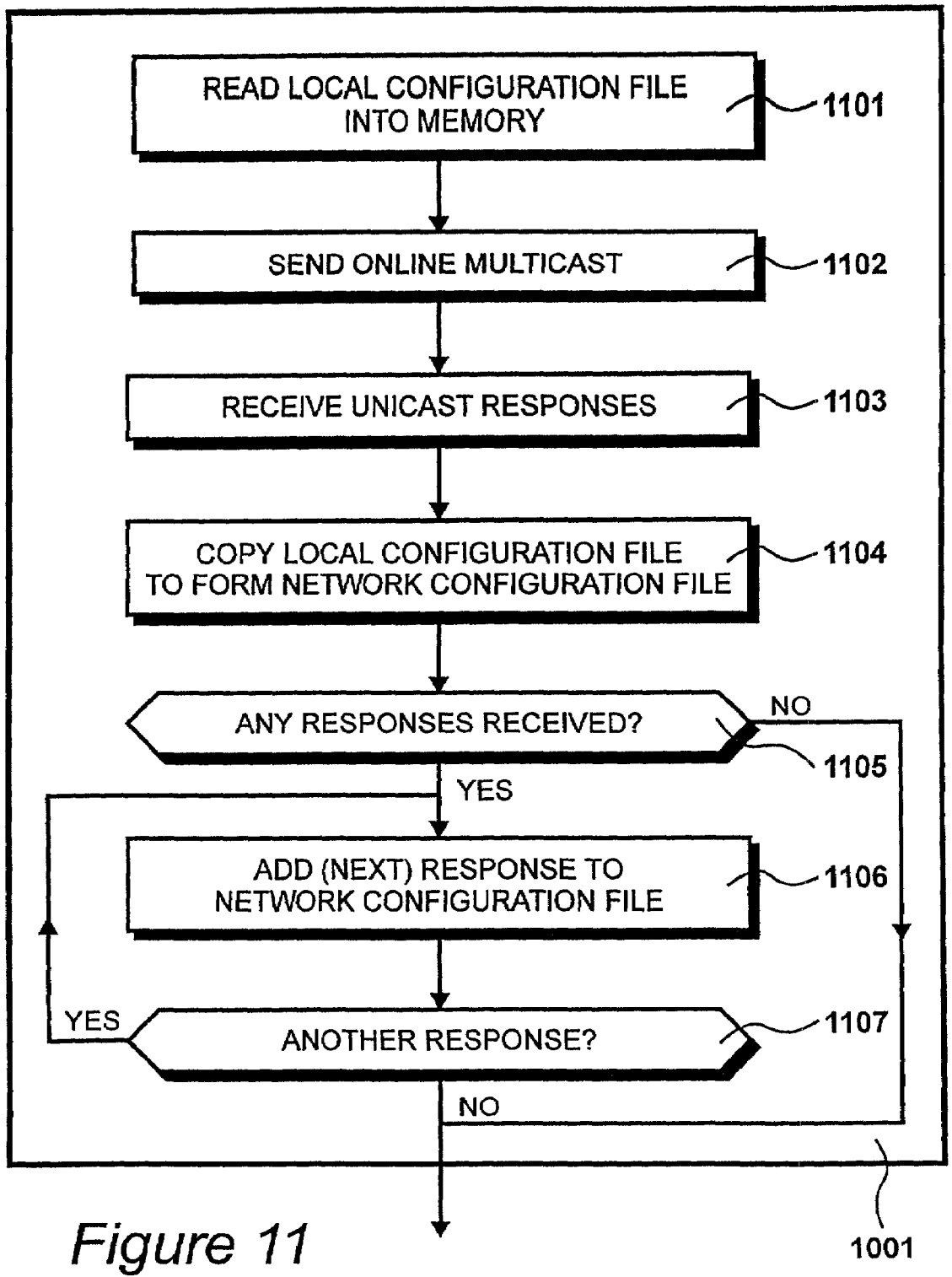
FIG. 11 details steps carried out in FIG. 10 to write the network configuration file.

FIG. 11 details step 1001, the process which occurs when processing system 102 is switched on. At step 1101 local configuration data 341 is read into memory 322 as local configuration file 342 and at step 1102 the information contained in file 342, together with a message notifying that the processing system sending the message is online, is multicast on the network. A multicast is a message sent to all users on the network whose Ethernet address starts with a certain sequence of digits, so when this network was set up it would be configured so that all processing systems connected to a particular fibre channel switch have an address starting in the same way. Hence a processing system can easily be added to the network since as long as its address starts in a particular way it will receive the multicasts.

In this embodiment processing systems 101 to 108 are the only systems in the network, but in an alternative embodiment (not shown) there is a large network of processing systems within which there is a number of 'sub-networks', each arranged around one of several fibre channel switches. Within each of these sub-networks all the processing systems have Ethernet addresses which start in the same way and differently from any system on a different sub-network. Setting up a network in this way and using multicasts ensures that processing systems only receive information which is relevant to them. It also means that, if necessary, a processing system can be moved between sub-networks simply by changing its Ethernet address.

At step 1103 responses are received from all processing systems within the network which received the multicast and which are switched on. These responses are in the form of unicasts, which are messages sent only to one processing system. Each of these unicasts comprises the information contained in the local configuration file in the memory of the processing system which sent it. Hence each processing system which is connected to the fibre channel switch and which is online has sent its local configuration information to processing system 102.

At step 1104 file 342 is copied to become the basis for network configuration file 343 and at step 1105 the question is asked as to whether any responses were received at step 1103. If no other processing systems are switched on then no unicasts will have been received in response. This is unlikely, as processing system 101 must be online in order for the fibre channel switch to be operated and, as observed before, in most environments all of the processing systems would remain operational unless taken off-line for a specific reason, but it is possible, so if the question asked at step 1105 is answered in the negative then step 1001 is completed since there is no information to add to network configuration file 343.

If the question asked at step 1105 is answered in the affirmative, then at step 1106 the information contained in the first received unicast is added to file 343. At step 1107 the question is asked as to whether another unicast has been received. If this question is answered in the affirmative then control is returned to step 1106 and the next unicast is added to file 343. Eventually, all responses will have been processed and the question asked at step 1107 will be answered in the negative. At this point, network configuration file 343 is complete and gives an accurate picture of the network.

As shown in FIG. 7, all available framestores are listed first under FRAMESTORES, together with the Ethernet addresses of the processing systems to which they are connected and their IDs. Each framestore is listed again under INTERFACES together with the preferred interface information of the processing system to which it is connected. If a processing system is not online then the framestore which it controls is not available, so no reply will have been received from that processing system and its framestore will not be listed in the network configuration file.

If no unicasts were received at step 1103 then network configuration file 343 will include only the information within the local configuration file 342.

When a user of a processing system specifies frames to which he requires access the application he is using looks at the framestore ID contained within the frame IDs. It searches for that framestore ID in the INTERFACES section of network configuration file 343, and so checks whether the framestore is available for access, and then determines the address to which the requests for access should be sent.

The information listed under FRAMESTORES is used when a swap of framestores takes place. When this occurs the location data given in FIG. 4 must also be swapped between the processing systems and in this case the Ethernet must be used, and so it is only the Ethernet addresses which are listed in this section.

FIG. 12

Figure 12:
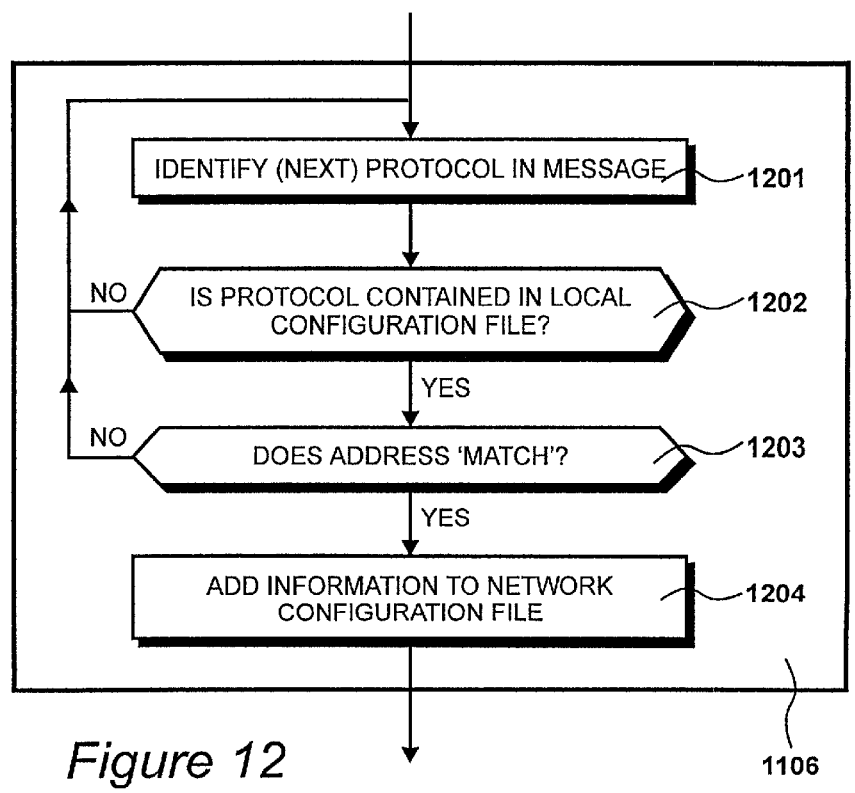
FIG. 12 details steps carried out in FIG. 11 to determine the best interface for communication.

FIG. 12 details step 1106 which adds information contained in a message (a unicast or multicast) to network configuration file 343. These messages contain the local configuration file of the sender, similar to that shown in FIG. 6. At step 1201 the INTERFACES information contained in the message is read to identify the first listed protocol. As previously stated, the interfaces are listed by the speed and hence desirability of the networks to which they connect. Hence if the first protocol listed in the message matches a protocol listed in file 342, this is the interface which will be used for communication. If the first protocol does not match then the second is checked and so on. There will always be a protocol which matches because all processing systems are connected by the Ethernet.

Hence at step 1202 the question is asked as to whether the identified protocol is listed in file 342. If this question is answered in the negative then control is returned to step 1201 and the next protocol is identified.

If the question is answered in the affirmative then at step 1203 the question is asked as to whether the addresses for that protocol 'match', ie whether they start in a similar way. A protocol may be used for more than one network and hence when a matching protocol is found it must be checked that the networks also match. Hence if the addresses do not start in the same way they are addresses for different networks using the same protocol, and so if the question is answered in the negative then control is returned to step 1201 and the next protocol is identified. 1201 and the next protocol is identified.

If the question asked at step 1203 is answered in the affirmative then the fastest network which both processing systems support has been found. Thus at step 1204 the message is once more read and the information under FRAMESTORES and the single line of information under INTERFACES which refers to the last checked protocol are written to network configuration file 343. The message has now been added to the network configuration file.

FIG. 13

Figure 13:
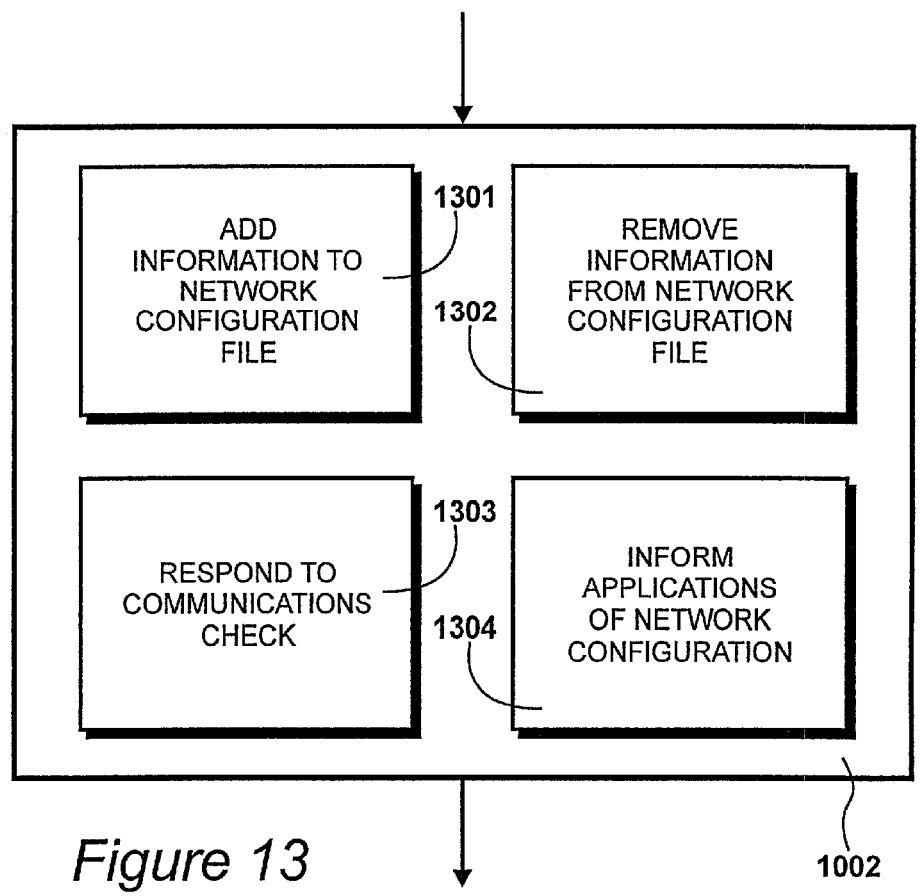
FIG. 13 shows the functions carried out by the primary thread to update the network configuration file.

The functions performed at step 1002 are detailed in FIG. 13.

Function 1301 adds information to network configuration file 343 when another processing system joins the network or changes its local configuration data in any way.

Function 1302 deletes information from the network configuration file 343 when a processing system shuts down or swaps framestores.

Figure 21:
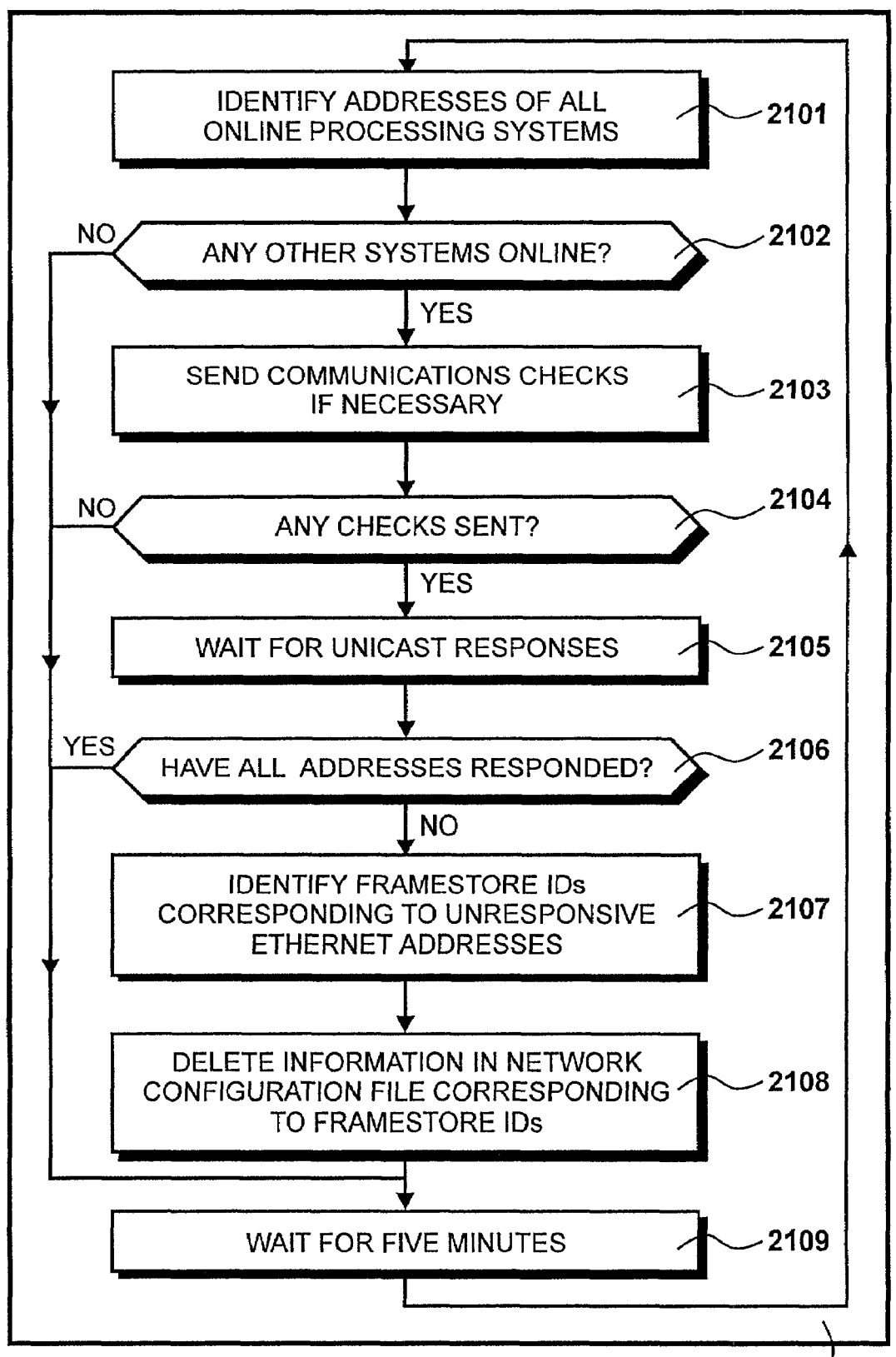
FIG. 21 illustrates the communications check function as shown in FIG. 20.

Function 1303 responds to communications checks to confirm processing system 101 is still online. Maintenance thread 901 sends out similar communications checks as shown in FIG. 21.

Function 1304 provides applications running on processing system 102 with accurate information about which framestores are connected to which processing systems.

FIG. 14

Figure 14:
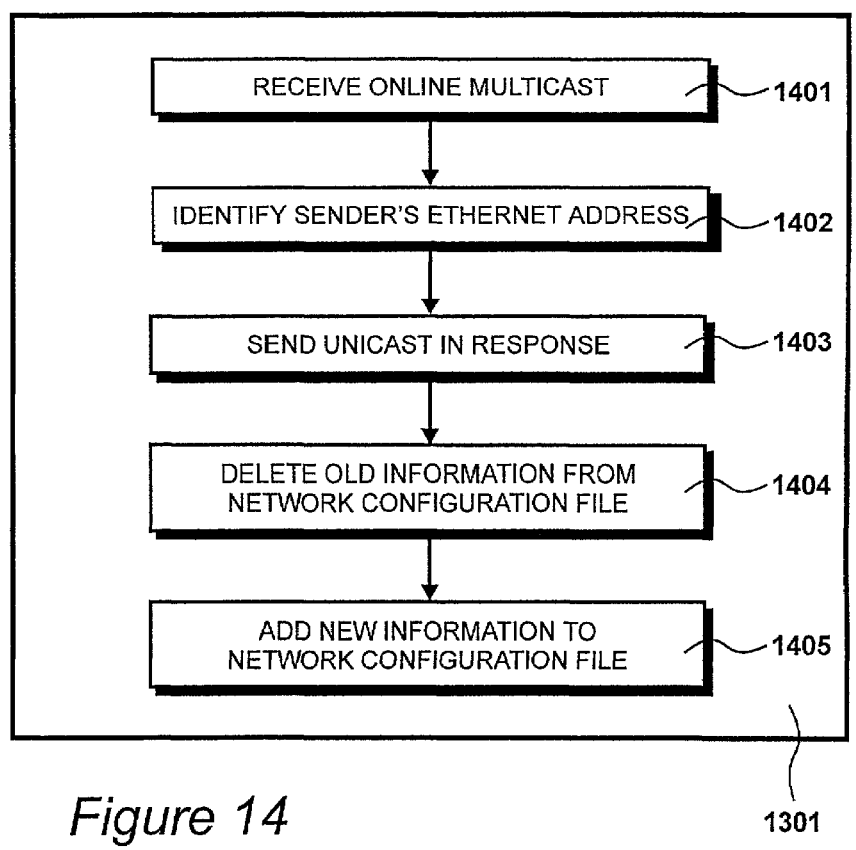
FIG. 14 illustrates the information-adding function shown in FIG. 13.

Function 1301 is detailed in FIG. 14. At step 1401 a multicast is received from a processing system, say processing system 103, which has just been switched on. This is in the same form as the multicast sent by processing system 102 at step 1102. It contains the local configuration information of processing system 103 together with a message that the system sending the multicast is online.

At step 1402 the Ethernet address of the transmitting system is read from the FRAMESTORES section of the multicast and at step 1403 the information contained in file 342 in the memory 402 of processing system 102 is unicast back to processing system 103.

At step 1404 any entries which conflict with the information just received are removed from network configuration file 343. There will not be conflicting information if the multicast has been sent by a processing system just coming online, but there will be when a framestore swap occurs. In this case there will already be entries for each framestore but the interfaces will be wrong.

At step 1404 the information contained in the multicast is added to network configuration file 343, in exactly the same way that information contained in responding unicasts received at step 1103 was added to the network configuration file at step 1104, as detailed in FIG. 12.

Thus the network configuration file on each processing system is updated whenever any other processing system within the network is switched on or multicasts out changed details.

FIG. 15

Figure 15:
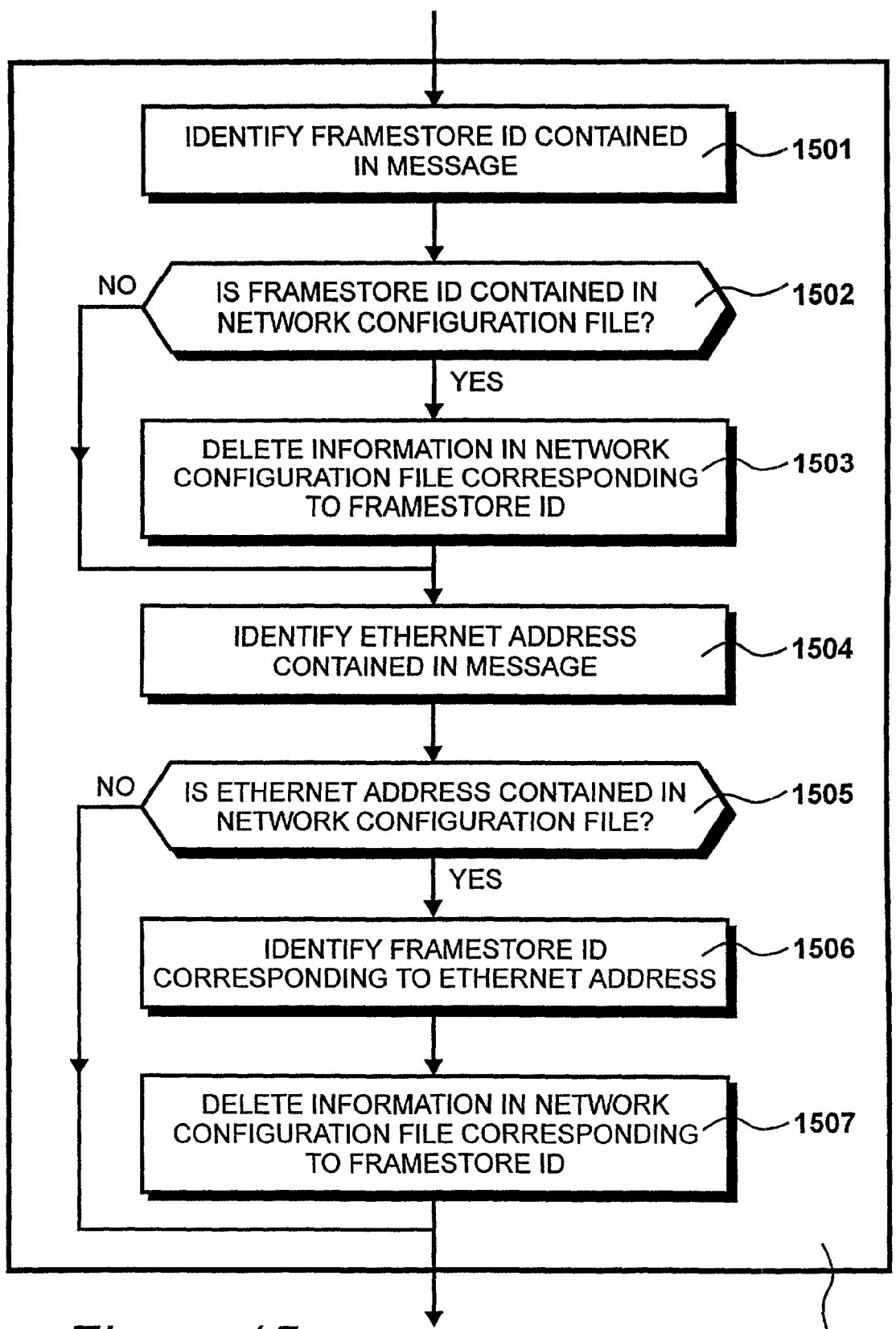
FIG. 15 details steps carried out in FIG. 14 to delete incorrect information from the network configuration file.

FIG. 15 details step 1404 at which entries which conflict with the received information are deleted. At step 1501 the message is read and the framestore ID contained within it is identified.

At step 1502 the question is asked as to whether this ID is contained within network configuration file 343. If this question is answered in the affirmative then at step 1503 the entries under FRAMESTORES and under INTERFACES corresponding to this ID are removed.

At this point, and if the question asked at step 1502 is answered in the negative, control is directed to step 1504 at which point the Ethernet address contained in the multicast is identified. At step 1505 the question is asked as to whether this address is contained within network configuration file 343. It is necessary for this question to be asked even if the framestore ID was not contained in the network configuration file, since it is possible for an Ethernet address to already be in a network configuration file but not the ID, or vice versa, as a new processing system or framestore could have been connected to an existing framestore or processing system.

If the question asked at step 1505 is answered in the affirmative then the entries under FRAMESTORES and under INTERFACES which correspond to the Ethernet address should be deleted. However, since it may not be the Ethernet address but a different one which appears in the INTERFACES section, the framestore ID linked with the Ethernet address is identified at step 1506 by examining the FRAMESTORES section of network configuration file 343. At step 1507 the information corresponding to that ID in both sections is deleted.

FIG. 16

Figure 16:
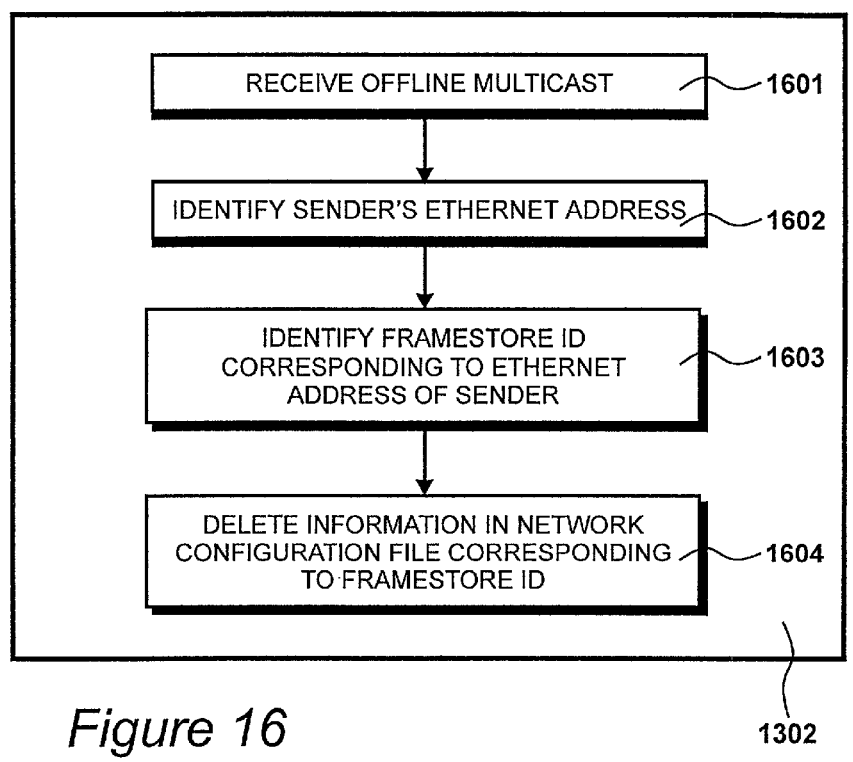
FIG. 16 illustrates the information-deleting function shown in FIG. 13.

FIG. 16 details function 1302 which deletes information from the network configuration file when a processing system shuts down or swaps framestores. At step 1601 a multicast is received containing information that a particular processing system, say system 104, is offline. This is in the same form as a multicast sent when a system switches on in that it contains the local configuration file of processing system 104, except that the extra message contained indicates that the system sending the multicast is offline rather than online. No unicast is sent in response to this multicast.

At step 1602 the Ethernet address of the transmitting system, in this case processing system 104, is read from the FRAMESTORES section of the multicast.

At step 1603 the process examines the FRAMESTORES part of network configuration file 343 on processing system 101 and identifies the framestore which is linked with the address of processing system 104, identified at step 1602. At step 1604 the information about this framestore under FRAMESTORES and under INTERFACES is deleted from the file. Thus the network configuration file on each processing system is updated whenever any other processing system shuts down.

FIG. 17

Figure 17:
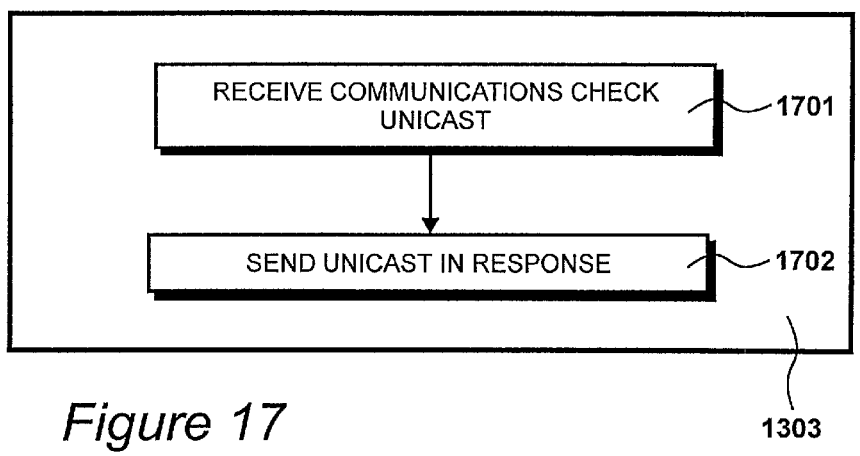
FIG. 17 illustrates the communications check responding function shown in FIG. 13.

FIG. 17 details process 1303 which responds to a communications check. At step 1701 a communications check unicast is received, say from processing system 105, which contains only the Ethernet address of the sending processing system. This is a check by system 105 to ensure that processing system 101 is still online and has not crashed. At step 1702 a replying unicast is sent to processing system 105. Checks of this kind are sent out from processing system 101 by maintenance thread 901, as shown in FIG. 21.

FIG. 18

Figure 18:
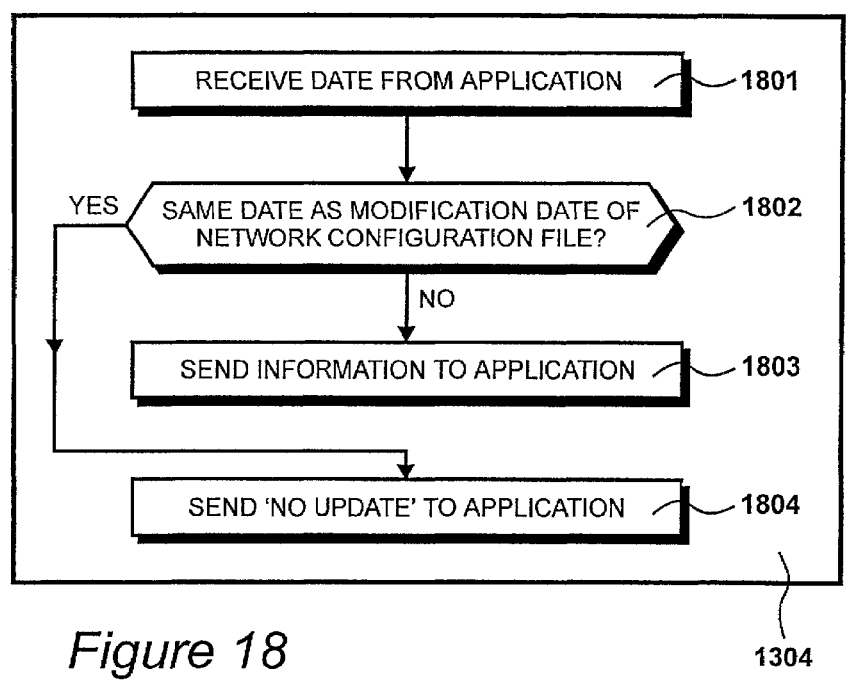
FIG. 18 illustrates the information-supplying function shown in FIG. 13.

FIG. 18 details function 1304 which supplies information to applications running on processing system 101. At step 1801 a request for information is received in the form of a time and date. This is the modification date of the file which the application currently holds. (If an application has not requested information before, the date sent will be midnight at 01 Jan. 2000.)

At step 1802 the question is asked as to whether this time and date is the same as the modification time and date of network configuration file 343. If this question is answered in the negative then the network configuration file has been updated since the last time the information was sent to the application, and so at step 1803 the information contained under INTERFACES within network configuration file 343 is sent to the application.

If the question asked at step 1802 is answered in the affirmative then no updates have taken place and the information the application has is still correct. In this case, control is directed to step 1804 at which a message 'NO UPDATE' is sent to the application.

In this way, applications are supplied with up-to-date information when they need it. The information is required when a user wishes to access information stored on a framestore to which he is not connected. When a processing system requests access to another framestore this request may be sent by the fastest route possible, which is why it is the interface to the fastest network which is listed under INTERFACES and sent to the applications.

FIG. 19

Figure 19:
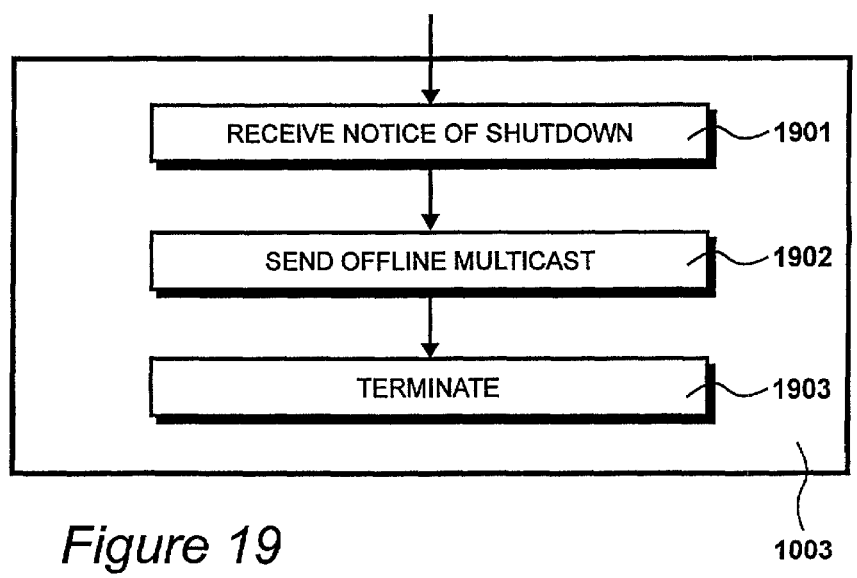
FIG. 19 details the termination of the primary thread.

FIG. 19 details step 1003, the termination of primary thread 801. This only occurs when processing system 101 is shut down for any reason, so at step 1901 the thread receives notice that the processor is going to shut down.

At step 1902 a multicast is sent out containing the file 342 stored in the memory 342 of processing system 101, together with a message that the system is going offline, similar to that received from processing system 104 at step 1601, so that all other processing systems can remove the framestore controlled by processor 101 from their respective network configuration files. No responses are received to this multicast.

At step 1903 thread 801 terminates. Since the network configuration file 343 is stored in memory 322 it is lost when the processor switches off, similarly for file 342. Hence there is no old information to conflict with the correct network configuration when the processor next starts up and loads the local configuration data 341 from the hard drive 327.

FIG. 20

Figure 20:
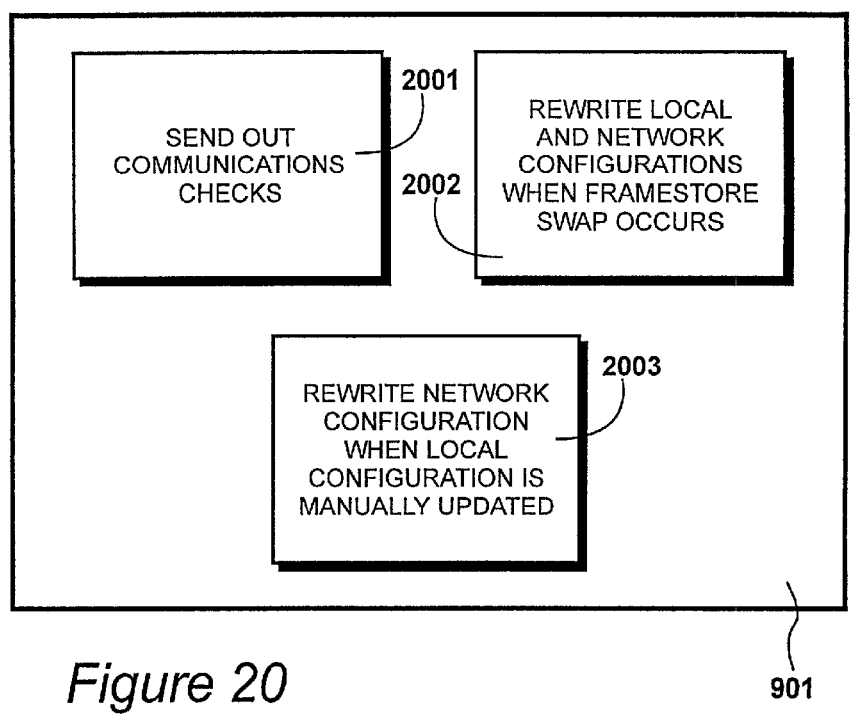
FIG. 20 shows the functions carried out by the maintenance thread.

FIG. 20 shows the functions of maintenance thread 901. This thread runs on each of processing systems 101 to 108 but in this example runs on processing system 101.

Function 2001 is the sending out of communications checks to ensure that other processing systems are still online.

Function 2002 rewrites the local and network configurations 341 and 343 whenever a framestore swap occurs between processing system 101 and any other system.

Function 2003 rewrites network configuration file 343 if for any reason local configuration data 341 is manually changed.

FIG. 21

FIG. 21 details process 2001 at which communication checks are sent out. At step 2101 the FRAMESTORES part of network configuration file 343 is read to identify the Ethernet addresses of all online processing systems. The first address is ignored as this is the address of processing system 101 itself.

At step 2102 the question is asked as to whether the network configuration file contains any addresses, apart from the address of system 101. If this question is answered in the negative then no communications check is necessary since no other processing systems are online, and so control is directed to step 2109, whereby the process waits for a specified length of time, which in this example is five minutes, before trying again.

If the question asked at step 2102 is answered in the affirmative then at step 2103 communications checks are sent to all addresses which have not been 'seen', i.e. with which there has been no communication in the last five minutes. If there has been communication then a communication check is unnecessary. If all systems have been 'seen' then no unicasts will be sent, so at step 2104 the question is asked as to whether any communications checks were made. If this question is answered in the negative then control is directed to step 2109 at which the process waits for five minutes before returning to step 2101.

If the question asked at step 2104 is answered in the affirmative then at step 2105 responses are received from the checked addresses.

At step 2106 the question is asked as to whether replies were received from all the addresses to which checks were sent. If this question is answered in the affirmative then control is directed to step 2109 where the process waits for five minutes. If the question is answered in the negative then at step 2107 the process examines the FRAMESTORES part of the network configuration file to identify the framestores linked with the addresses which did not respond. The information corresponding to these framestores under FRAMESTORES and under INTERFACES is deleted from the network configuration file at step 2108.

At step 2109 the process waits. After waiting for five minutes control is returned to step 2101 and the process starts again.

FIG. 22

Figure 22:
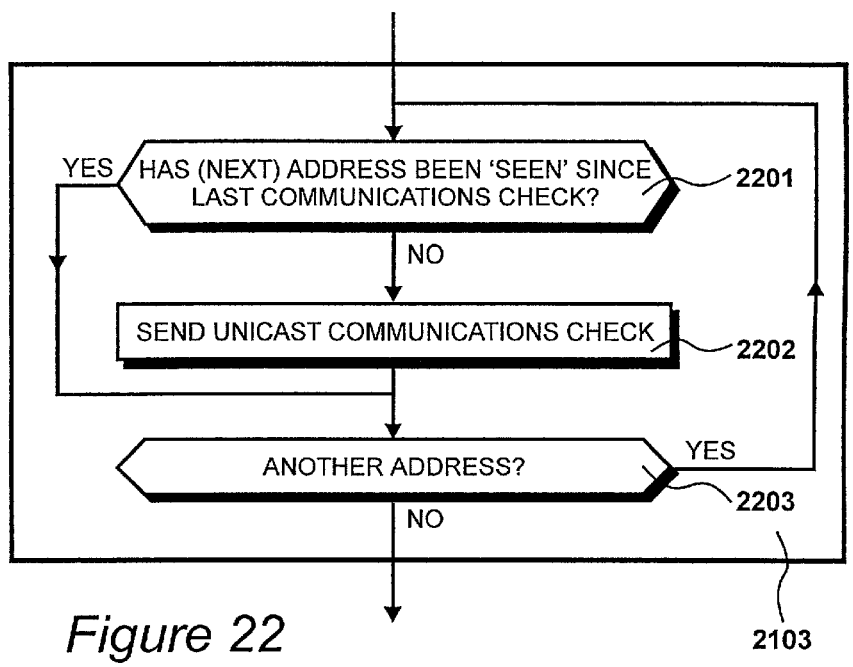
FIG. 22 details steps carried out in FIG. 21 to determine addresses to be checked.

FIG. 22 details step 2103 whereby communications checks are sent out. Every time a multicast or unicast is received from a processing system this is logged so that unnecessary checks are not sent to systems which have recently communicated. Regardless of which network is used for the message, it is the corresponding Ethernet address which is logged. Hence at step 2201 the question is asked as to whether the first Ethernet address identified at step 2101 has been 'seen', i.e. logged, since the last communications check.

If this question is answered in the negative then at step 2202 a communications check is sent to that address. The check takes the form of a unicast which only contains the Ethernet address of the sender, similar to that received at step 1701. This prompts the receiving processing system to send a unicast in reply containing its Ethernet address, similar to that sent at step 1702.

If the question asked at step 2201 is answered in the affirmative, ie the address has been 'seen' recently, then control is directed to step 2203 at which the question is asked as to whether there is another address to check. If this question is answered in the affirmative then control is returned to step 2201 and the next address is checked. If it is answered in the negative then all necessary communications checks have been sent.

The communications check ensures that if a processor crashes then every processing system in the network is made aware that a particular processing system is no longer contactable. If a processor crashes then the framestore which it controls is not available for access, so it should be removed from the network configuration file.

FIG. 23

Figure 23:
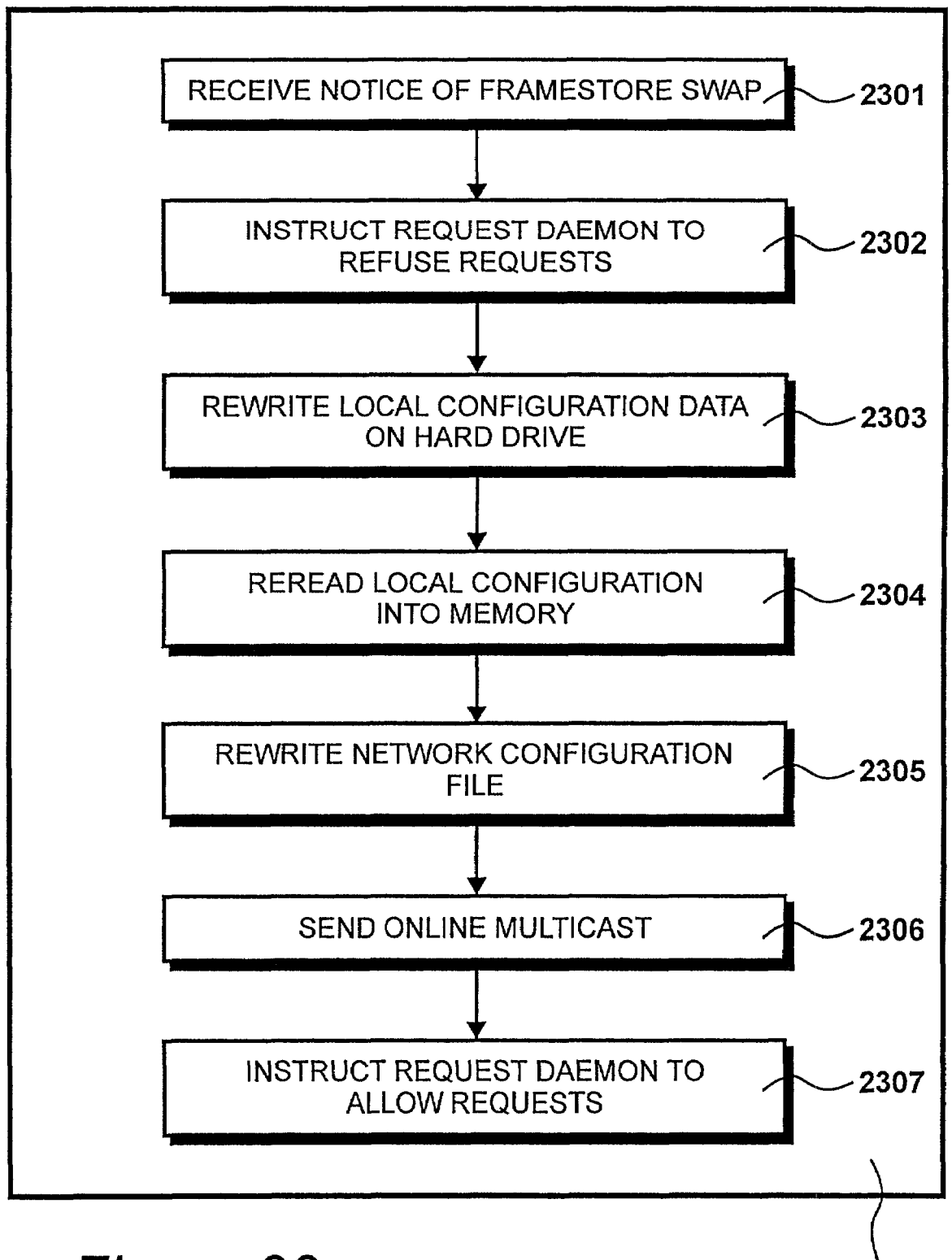
FIG. 23 illustrates the swap update function as shown in FIG. 20.

FIG. 23 details function 2002, the rewriting of the configuration files when a framestore swap occurs.

At step 2301 a unicast is received from swap utility 911, which could be running on any processing system but in this example is running on processing system 101. This contains the name and ID of the framestore which processing system 101 now controls. A similar unicast is sent to the other processing system taking part in the swap, in this example processing system 102.

At step 2302 a message is sent to a request daemon running on processing system 101 which catches requests for remote access to the framestore which system 101 controls. This message instructs the daemon to turn away all requests until further notice. This is because until the network configuration files on processing systems 102 to 108 are updated they will be sending requests for access to framestore 111 to processing system 101, but framestore 111 is now controlled by processing system 102 and so the requests cannot be honoured.

At step 2303 local configuration data 341 is rewritten by replacing the framestore name and ID contained within it with the new name and ID received from swap utility 911. At step 2304 data 341 is reread into memory as local configuration file 342 replacing the existing file.

At step 2305 the network configuration file is rewritten and at step 2306 local configuration file 342 is multicast onto the Ethernet so that all other processing systems know of the change.

At step 2307 the request daemon is instructed to allow requests for access since processing systems 102 to 108 will now be sending requests to the correct processing system.

FIG. 24

Figure 24:
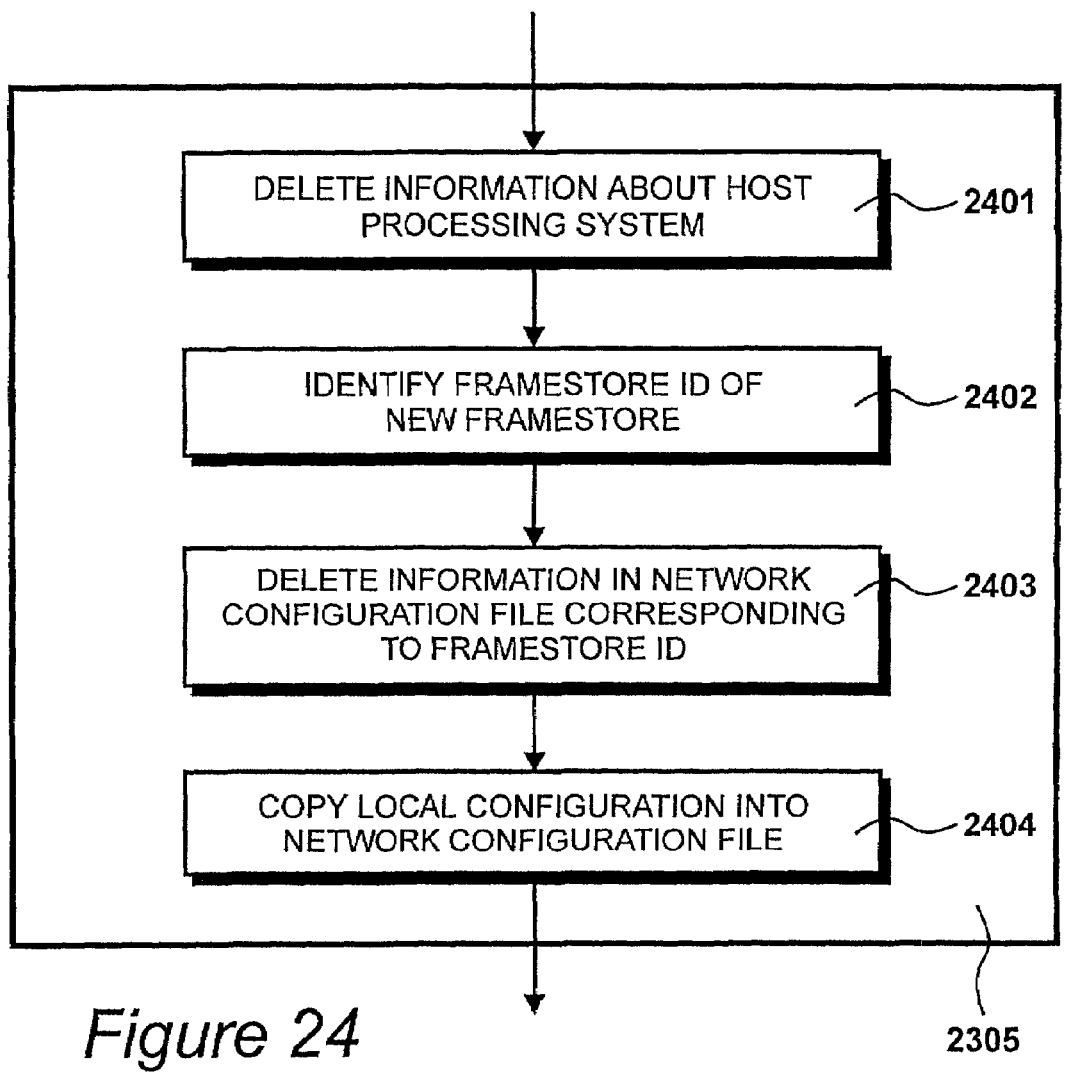
FIG. 24 details steps carried out in FIG. 23 to rewrite the network configuration file.

FIG. 24 details step 2305 at which network configuration file 343 is rewritten. At step 2401 the information about the first listed framestore is deleted, under both FRAMESTORES and INTERFACES. This is always the information about the framestore which processing system 101 controls and it has now changed.

At step 2402 the framestore ID of the framestore which processing system 101 now controls is identified from local configuration file 342 and at step 2403 the entries under FRAMESTORES and INTERFACES corresponding to that ID are deleted. The information about this ID relates to the processing system with which processing system 101 has swapped and is now incorrect.

At step 2404 the information contained in local configuration file 342 is copied in and network configuration file 343 is now up-to-date and may be multicast at step 2306.

FIG. 25

Figure 25:
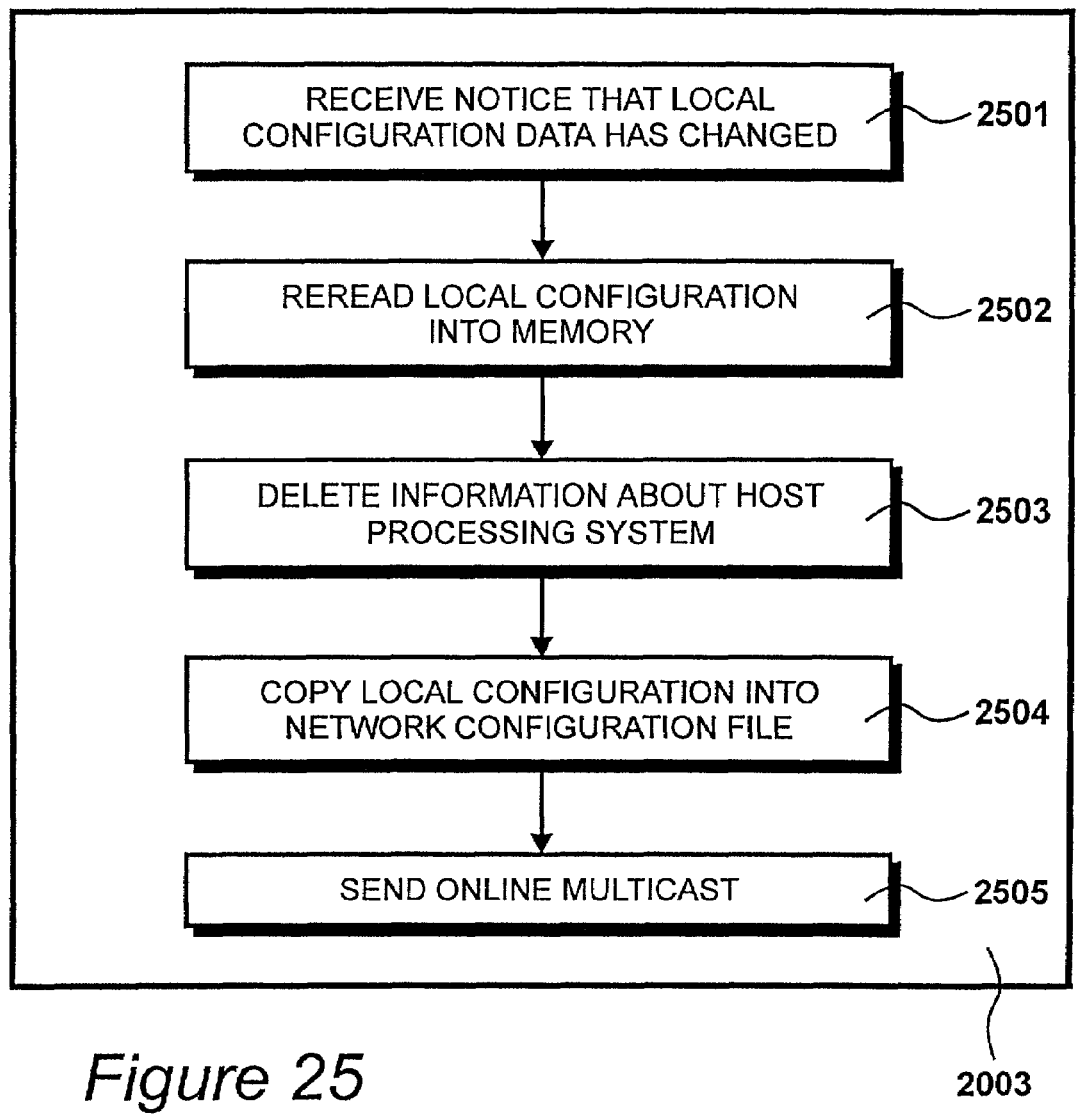
FIG. 25 illustrates the manual change update function as shown in FIG. 20.

FIG. 25 illustrates function 2003. This runs when a user updates local configuration data 341, for instance because interface information has changed.

At step 2501 thread 901 receives notice that the local configuration has changed. This is a message triggered by the saving of the local configuration data. At step 2502 the local configuration data is reread into memory as file 342.

At step 2503 the information about the first listed framestore, ie that controlled by processing system 101, is deleted from network configuration file 343, as at step 2401, and at step 2504 the information from local configuration file 342 is read in.

At step 2505 the network configuration file is multicasted out on the Ethernet so that all other processing systems know of the change.

The invention claimed is:

1. Image data processing apparatus, comprising a plurality of image processing systems in which each of said image processing systems has direct access to a respective frame storage means; and a network connecting said image processing systems together so as to allow each connected image processing system to indirectly access the frame storage means of other connected image processing systems, wherein each connected image processing system comprises:
   (a) a local configuration file specifying details of said image processing system's respective locally connected storage means;
   (b) a network configuration data structure; and
   (c) network communication means, wherein, said network communication means is arranged to:
      (i) transmit details of said image processing system's associated local configuration file to said other connected networked image systems; and
      (ii) automatically add local configuration details, from said other networked image systems, to said image processing system's associated network configuration data structure in response to receiving the details of local configuration files from said other connected networked image processing systems;
   wherein the local configuration details comprise framestore information for the respectively locally connected storage means and interface information for the image processing system; and
   the network configuration data structure comprises framestore information for each frame storage means connected to image processing system on the network and interface information for one interface for each image processing system on the network.

2. Apparatus according to claim 1, wherein said data processing systems are based around a silicon graphics O$_2$, Octane or Onyx2 computer.

3. Apparatus according to claim 1, wherein said data storage systems include a plurality of disks configured to receive image stripes.

4. Apparatus according to claim 3, including redundant disks to provide data security.

5. Apparatus according to claim 4, wherein said disks are configured as a redundant array of inexpensive disks (RAID).

6. Apparatus according to claim 1, wherein said network includes a high bandwidth switching means.

7. Apparatus according to claim 6, wherein said high bandwidth switching means is a fibre channel switch.

8. Apparatus according to claim 1, wherein said network communication means is an Ethernet network.

9. Apparatus according to claim 1, including a local disk drive, wherein said configuration data is stored on said local disk drive.

10. Apparatus according to claim 1, including a high bandwidth fibre channel switch and a low bandwidth Ethernet, wherein image data is transferred ovet said high bandwidth fibre channel switch and said configuration data is transferred over said Ethernet.

11. The apparatus of claim 1 wherein:
   (a) the framestore information comprises:
      (i) a name for a framestore;
      (ii) a hardware address for the framestore; and
      (iii) a framestore identification reference number; and
   (b) the interface information comprises protocol and address information for every network to which the image processing system is connected.

12. The apparatus of claim 1 wherein the interface information for one interface for each image processing system on the network identifies the fastest interface between each image processing system on the network and a current image processing system.

13. A method of automatically writing network configuration data structures in a networked image data processing environment, comprising a plurality of image processing systems in which each of said image processing systems has direct access to a respective frame storage means, wherein each image processing system includes a local configuration file specifying details of said image processing system's respective locally connected storage means, a network configuration data structure, and network communication means; and a network connecting said image processing systems together so as to allow each connected image processing system to indirectly access the frame storage means of other connected image processing systems; wherein said method performs the steps of:
   transmitting details of said local configuration file to said other connected networked processing systems, and
   automatically add local configuration details, from said other connected networked processing system, to the networked configuration data structure in response to receiving the details of local configuration files from other networked image processing systems;
   wherein the local configuration details comprise framestore information for the respectively locally connected storage means and interface information for the image processing system; and
   the network configuration data structure comprises framestore information for each frame storage means connected to image processing system on the network and interface information for one interface for each image processing system on the network.

14. A method according to claim 13, configured for execution upon a silicon graphics O$_2$, Octane or Onyx2 computer.

15. A method according to claim 13, wherein image frames are divided into a plurality of stripes and said stripes are directed to respective disk storage devices.

16. A method according to claim 15, including a process of generating redundant data and supplying said redundant data to a redundant disk thereby providing a degree of security.

17. A method according to claim 16, wherein said disks are arranged as a redundant array of inexpensive disks (RAID).

18. A method according to claim 13, wherein said network includes a high bandwidth switching means.

19. A method according to claim 18, wherein said high bandwidth switching means is a fibre channel switch.

20. A method according to claim 13, wherein said network communication means is an Ethernet network.

21. A method according to claim 13, wherein said configuration data is stored on a local disk drive.

22. A method according to claim 13, wherein image data is transferred over a high bandwidth fibre channel switch and configuration data is transferred over an Ethernet network.

23. The method of claim 13 wherein:
  (a) the framestore information comprises:
    (i) a name for a frame store;
    (ii) a hardware address for the framestore; and
    (iii) a framestore identification reference number; and
  (b) the interface information comprises protocol and address information for every network to which the image processing system is connected.

24. The method of claim 13 wherein the interface information for one interface for each image processing system on the network identifies the fastest interface between each image processing system on the network and a current image processing system.

* * * * *